(12) United States Patent
Nam

(10) Patent No.: US 12,387,685 B2
(45) Date of Patent: Aug. 12, 2025

(54) VOLTAGE GENERATOR AND DISPLAY DEVICE INCLUDING THE SAME

(71) Applicant: Samsung Display Co., LTD., Yongin-si (KR)

(72) Inventor: Yanguk Nam, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/587,194

(22) Filed: Feb. 26, 2024

(65) Prior Publication Data

US 2024/0379060 A1    Nov. 14, 2024

(30) Foreign Application Priority Data

May 10, 2023   (KR) .................. 10-2023-0060236

(51) Int. Cl.
*G09G 3/3258* (2016.01)
*G09G 3/32* (2016.01)
*H02M 1/00* (2007.01)
*H02M 3/158* (2006.01)

(52) U.S. Cl.
CPC ............. *G09G 3/3258* (2013.01); *G09G 3/32* (2013.01); *H02M 1/0009* (2021.05); *H02M 1/0032* (2021.05); *H02M 3/1582* (2013.01); *G09G 2320/0247* (2013.01); *G09G 2330/021* (2013.01); *G09G 2330/028* (2013.01)

(58) Field of Classification Search
CPC ................... G09G 3/3258; G09G 3/32; G09G 2320/0247; G09G 2330/021; G09G 2330/028; H02M 1/0032; H02M 1/0009; H02M 3/1582

See application file for complete search history.

(56) References Cited

U.S. PATENT DOCUMENTS

2016/0329734 A1* 11/2016 Lee ................. H02M 3/156
2023/0118761 A1*  4/2023 Kim ................ H02M 1/38
                                                323/271
2023/0327548 A1* 10/2023 Yun ................ H02M 1/0058

FOREIGN PATENT DOCUMENTS

KR         100685103 B1    2/2007

* cited by examiner

*Primary Examiner* — Afroza Chowdhury
(74) *Attorney, Agent, or Firm* — CANTOR COLBURN LLP

(57) ABSTRACT

A voltage generator includes a single inductive element that performs a direct current-to-direct current (DC-DC) conversion on an input voltage to generate a first output voltage, a second output voltage, and a third output voltage, a gate driver which controls the single inductive element, a mode determiner which receives the input voltage, a first feedback voltage generated based on the first output voltage, and a third feedback voltage generated based on the third output voltage and outputs a mode signal, a zero-current detector which is connected to the single inductive element and outputs a zero-current signal, and a controller which receive the mode signal and the zero-current signal and outputs a control signal to the gate driver.

20 Claims, 12 Drawing Sheets

VOLTAGE GENERATOR AND DISPLAY DEVICE INCLUDING THE SAME

This application claims priority to Korean Patent Application No. 10-2023-0060236 filed on May 10, 2023, and all the benefits accruing therefrom under U.S.C. § 119, the content of which in its entirety is herein incorporated by reference.

BACKGROUND

1. Field

Embodiments of the disclosure described herein relate to a voltage generator capable of reducing power consumption and a display device including the same.

2. Description of the Related Art

In general, an electronic device that provides an image to a user, such as a smartphone, a digital camera, a notebook computer, a navigation system, or a smart television includes a display device for displaying an image. The display device generates an image and provides the generated image to the user through a display screen.

The display device typically includes a display layer including a plurality of pixels that generate an image, a timing controller that drives the pixels, and a voltage generator that provides an operating voltage to the pixels. The voltage generator may generate a first driving voltage and a second driving voltage used for the operation of the pixels. The first driving voltage and the second driving voltage may be applied to the pixels through power lines.

SUMMARY

Embodiments of the disclosure provide a voltage generator capable of reducing power consumption and a display device including the voltage generator.

According to an embodiment, a display device includes a display layer that includes a plurality of pixels, a voltage generator which receives an input voltage and provides a driving voltage to the plurality of pixels, and a timing controller which receives an image signal and drives the plurality of pixels. In such an embodiment, the voltage generator may include a single inductive element that performs a direct current-to-direct current (DC-DC) conversion on the input voltage to generate a first output voltage, a second output voltage, and a third output voltage, a gate driver which controls the single inductive element, a mode determiner which receives the input voltage, a first feedback voltage generated based on the first output voltage, and a third feedback voltage generated based on the third output voltage and outputs a mode signal, a zero-current detector which is connected to the single inductive element and outputs a zero-current signal, and a controller which receive the mode signal and the zero-current signal and outputs a control signal to the gate driver.

In an embodiment, the single inductive element may include an inductor and a plurality of switches connected to the inductor.

In an embodiment, the zero-current detector may detect a current of the inductor.

In an embodiment, the gate driver may output a gate control signal, which controls a turn-on or a turn-off of each of the plurality of switches, in a way such that the single inductive element is driven in a first mode or in a second mode different from the first mode.

In an embodiment, the mode determiner may calculate a voltage difference between the input voltage and the first output voltage or between the input voltage and the second output voltage. In such an embodiment, the mode signal may include a first mode signal and a second mode signal. In such an embodiment, the first mode signal may be output when the voltage difference exceeds a first voltage and a second voltage higher in voltage level than the first voltage or when the voltage difference exceeds the first voltage and is less than or equal to the second voltage and a previous mode of the single inductive element is the first mode. In such an embodiment, the second mode signal may be output when the voltage difference is less than or equal to the first voltage or when the voltage difference exceeds the first voltage and is less than or equal to the second voltage and the previous mode of the single inductive element is the second mode.

In an embodiment, the first mode may be a buck mode, and the second mode may be a buck-boost mode.

In an embodiment, the controller may drive the single inductive element in a first driving mode, a second driving mode, or a third driving mode. In such an embodiment, in the first driving mode, the controller may generate the control signal based on the mode signal and the zero-current signal. In such an embodiment, in the second driving mode, the controller may generate the control signal based only on the mode signal. In such an embodiment, in the third driving mode, the controller may generate the control signal in a way such that the single inductive element is driven only in the second mode.

In an embodiment, in the first driving mode, the single inductive element may be driven in the first mode when the controller receives the first mode signal and the zero-current signal having a first value, the single inductive element may be driven in the second mode when the controller receives the first mode signal and the zero-current signal having a second value different from the first value, and the single inductive element may be driven in the second mode when the controller receives the second mode signal.

In an embodiment, the timing controller may allow the display layer to operate in a high luminance mode. In such an embodiment, before the display layer operates in the high luminance mode, the timing controller may output an enable signal to the voltage generator. In such an embodiment, when the voltage generator receives the enable signal, the voltage generator may drive the single inductive element in the second mode.

In an embodiment, each of the first output voltage and the third output voltage may be generated when the single inductive element is driven in the first mode being a buck mode or the second mode being a buck-boost mode, and the second output voltage may be generated when the single inductive element is driven in an inverting buck-boost mode.

In an embodiment, the driving voltage may include a first driving voltage generated based on the first output voltage and a second driving voltage generated based on the second output voltage and lower in voltage level than the first driving voltage.

According to an embodiment, a voltage generator includes a single inductive element which performs a DC-DC conversion on an input voltage to generate a first output voltage, a second output voltage, and a third output voltage, a gate driver which controls the single inductive element, a mode determiner which receives the input voltage, a first feedback voltage generated based on the first output voltage, and a third feedback voltage generated based on the third output voltage and outputs a mode signal, a zero-current detector which is connected to the single inductive element and outputs a zero-current signal, and a controller which receives the mode signal and the zero-current signal and outputs a control signal to the gate driver.

In an embodiment, the single inductive element may include a buck-boost converter including an inductor and a plurality of switches connected to the inductor.

In an embodiment, the zero-current detector may detect a current of the inductor.

In an embodiment, the gate driver may output a gate control signal, which controls a turn-on or a turn-off of each of the plurality of switches, in a way such that the single inductive element is driven in a first mode or in a second mode different from the first mode.

In an embodiment, the mode determiner may calculate a voltage difference between the input voltage and the first output voltage or between the input voltage and the second output voltage, and the mode signal may include a first mode signal and a second mode signal. In such an embodiment, the first mode signal may be output when the voltage difference exceeds a first voltage and a second voltage higher in voltage level than the first voltage or when the voltage difference exceeds the first voltage and is less than or equal to the second voltage and the mode signal previously output by the mode determiner is the first mode signal. In such an embodiment, the second mode signal may be output when the voltage difference is less than or equal to the first voltage or when the voltage difference exceeds the first voltage and is less than or equal to the second voltage and the mode signal previously output by the mode determiner is the second mode signal.

In an embodiment, the first mode may be a buck mode, and the second mode may be a buck-boost mode.

In an embodiment, the controller may drive the single inductive element in a first driving mode, a second driving mode, or a third driving mode. In the first driving mode, the control signal may be generated based on the mode signal and the zero-current signal. In such an embodiment, in the second driving mode, the control signal may be generated based only on the mode signal. In such an embodiment, in the third driving mode, the control signal may be generated such that the single inductive element is driven only in the second mode.

In an embodiment, in the first driving mode, the single inductive element may be driven in the first mode when the controller receives the first mode signal and the zero-current signal having a first value, the single inductive element may be driven in the second mode when the controller receives the first mode signal and the zero-current signal having a second value different from the first value, and the single inductive element may be driven in the second mode when the controller receives the second mode signal.

In an embodiment, each of the first output voltage and the third output voltage may be generated when the single inductive element is driven in the first mode being a buck mode or the second mode being a buck-boost mode, and the second output voltage may be generated when the single inductive element is driven in an inverting buck-boost mode.

BRIEF DESCRIPTION OF THE DRAWINGS

The above and other features of the disclosure will become apparent by describing in detail embodiments thereof with reference to the accompanying drawings.

DETAILED DESCRIPTION

Figure 1A:
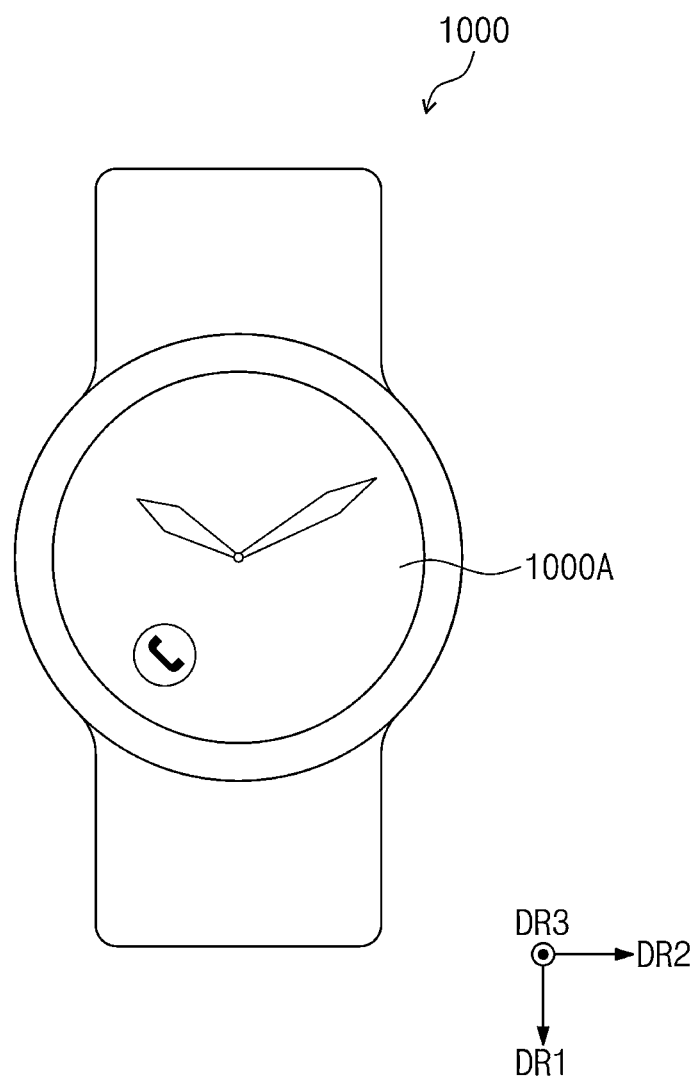
FIG. 1A illustrate a display device according to an embodiment of the disclosure.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

In the specification, the expression that a first component (or area, layer, part, portion, etc.) is "on", "connected with", or "coupled to" a second component means that the first component is directly on, connected with, or coupled to the second component or means that a third component is disposed therebetween.

Like reference numerals refer to like components. Also, in drawings, the thickness, ratio, and dimension of components are exaggerated for effectiveness of description of technical contents.

Although the terms "first", "second", etc. may be used to describe various components, the components should not be construed as being limited by the terms. The terms are only used to distinguish one component from another component. For example, without departing from the scope and spirit of the invention, a first component may be referred to as a "second component", and similarly, the second component may be referred to as the "first component".

Also, the terms "under", "below", "on", "above", etc. are used to describe the correlation of components illustrated in drawings. The terms that are relative in concept are described based on a direction shown in drawings.

The terminology used herein is for the purpose of describing particular embodiments only and is not intended to be limiting. As used herein, "a", "an," "the," and "at least one"

do not denote a limitation of quantity, and are intended to include both the singular and plural, unless the context clearly indicates otherwise. Thus, reference to "an" element in a claim followed by reference to "the" element is inclusive of one element and a plurality of the elements. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical terms and scientific terms) used in the specification have the same meaning as commonly understood by one skilled in the art to which the disclosure belongs. Furthermore, terms such as terms defined in the dictionaries commonly used should be interpreted as having a meaning consistent with the meaning in the context of the related technology, and should not be interpreted in ideal or overly formal meanings unless explicitly defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of the disclosure will be described in detail with reference to the accompanying drawings.

Figure 1B:
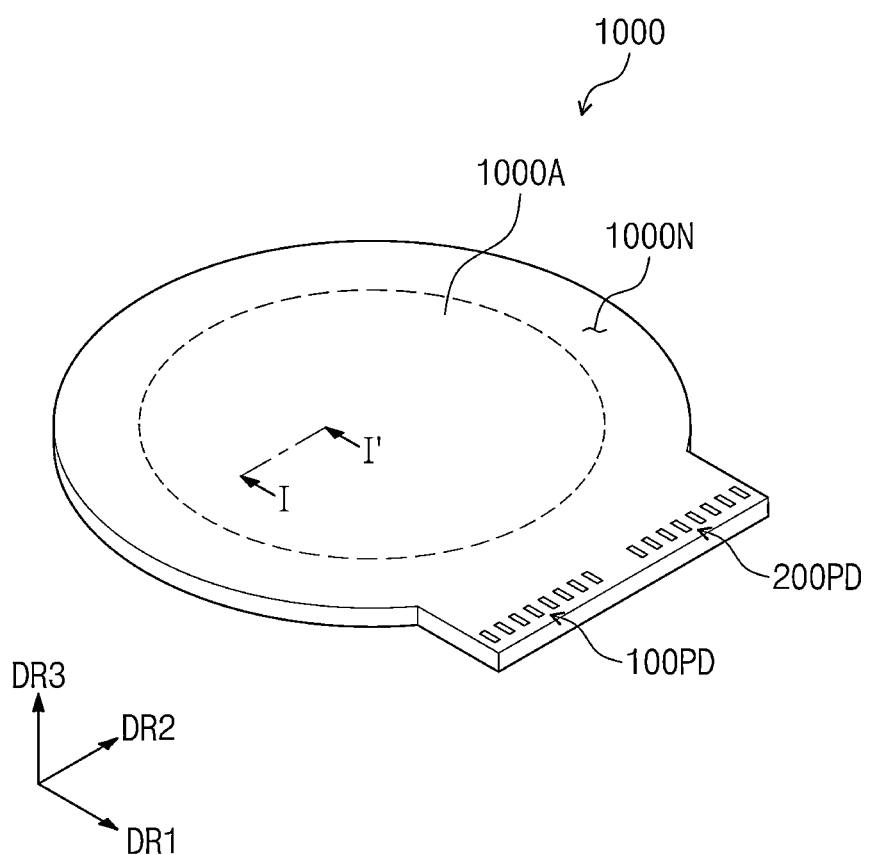
FIG. 1B is a perspective view of a display device according to an embodiment of the disclosure.

FIG. 1A illustrate a display device according to an embodiment of the disclosure, and FIG. 1B is a perspective view of a display device according to an embodiment of the disclosure.

Referring to FIGS. 1A and 1B, a display device 1000 may refer to an electronic device that is activated depending on an electrical signal. The display device 1000 may include various embodiments. In an embodiment, for example, the display device 1000 may include a tablet, a notebook, a computer, a smart television, a foldable smartphone, etc. In FIGS. 1A and 1B, an embodiment in which the display device 1000 is a wearable device is illustrated as an example.

The display device 1000 may display time information, whether information, icons for performing various kinds of applications or operations, etc. The user may operate the display device 1000 through a touch operation.

An active area 1000A and a surrounding area 1000N may be defined in the display device 1000. The surrounding area 1000N may be adjacent to the active area 1000A and may surround the active area 1000A.

The display device 1000 may display an image through the active area 1000A and may sense an input applied from the outside. The input may be an input of the user. The user input may include various types of external inputs such as a part of the user's body, a light, heat, a pen, and a pressure.

The active area 1000A may include a surface on a plane defined by a first direction DR1 and a second direction DR2, but the disclosure is not particularly limited thereto. In an embodiment, for example, the active area 1000A may include a curved surface or may include both a curved plane and a flat surface. In an embodiment, a third direction DR3 intersecting both the first direction DR1 and the second direction DR2 may be a thickness direction of the display device 1000.

The display device 1000 may include display pads 100PD electrically connected to a display layer 100 (refer to FIG. 3) and sensor pads 200PD (hereinafter referred to as "pads") electrically connected to a sensor layer 200 (refer to FIG. 3). In an embodiment, a single printed circuit film may be attached to the display pads 100PD and the pads 200PD, but the disclosure is not particularly limited thereto. In an alternative embodiment, for example, a first printed circuit film may be attached to the display pads 100PD, and a second printed circuit film may be attached to the pads 200PD.

The display device 1000 according to an embodiment of the disclosure may be driven in a normal mode in which an image is displayed in the active area 1000A normally or in a power-saving mode in which an image is displayed in the active area 1000A with a low power. The power-saving mode may refer to a driving scheme in which maximum luminance is limited to given luminance or lower such that power consumption is minimized. In an embodiment, for example, the power-saving mode may include an always-on-display (AOD) mode in which simple display information (e.g., a clock image) is always displayed, a predetermined display mode in which a screen is displayed with ultra-low luminance in a dark environment, etc.

Figure 2A:
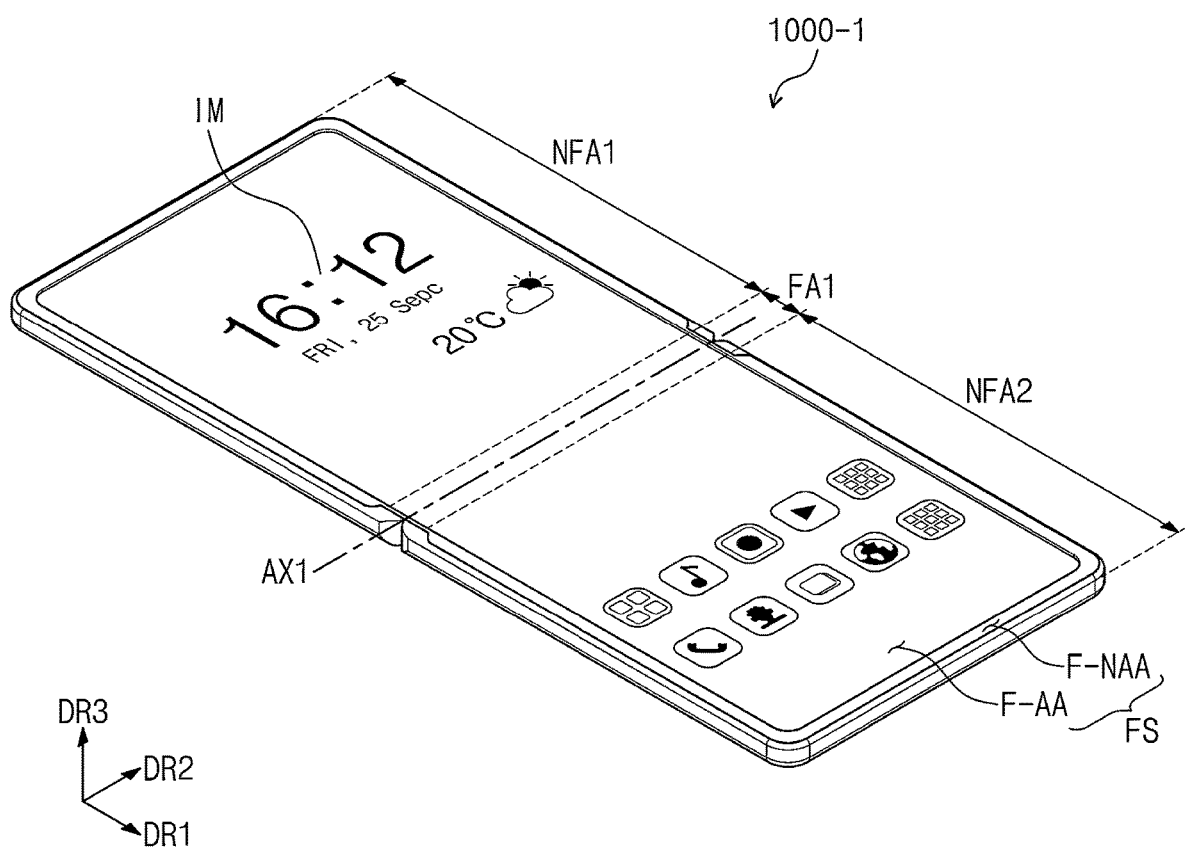
FIG. 2A is a perspective view illustrating a display device in an unfolded state, according to an embodiment of the disclosure.
Figure 2B:
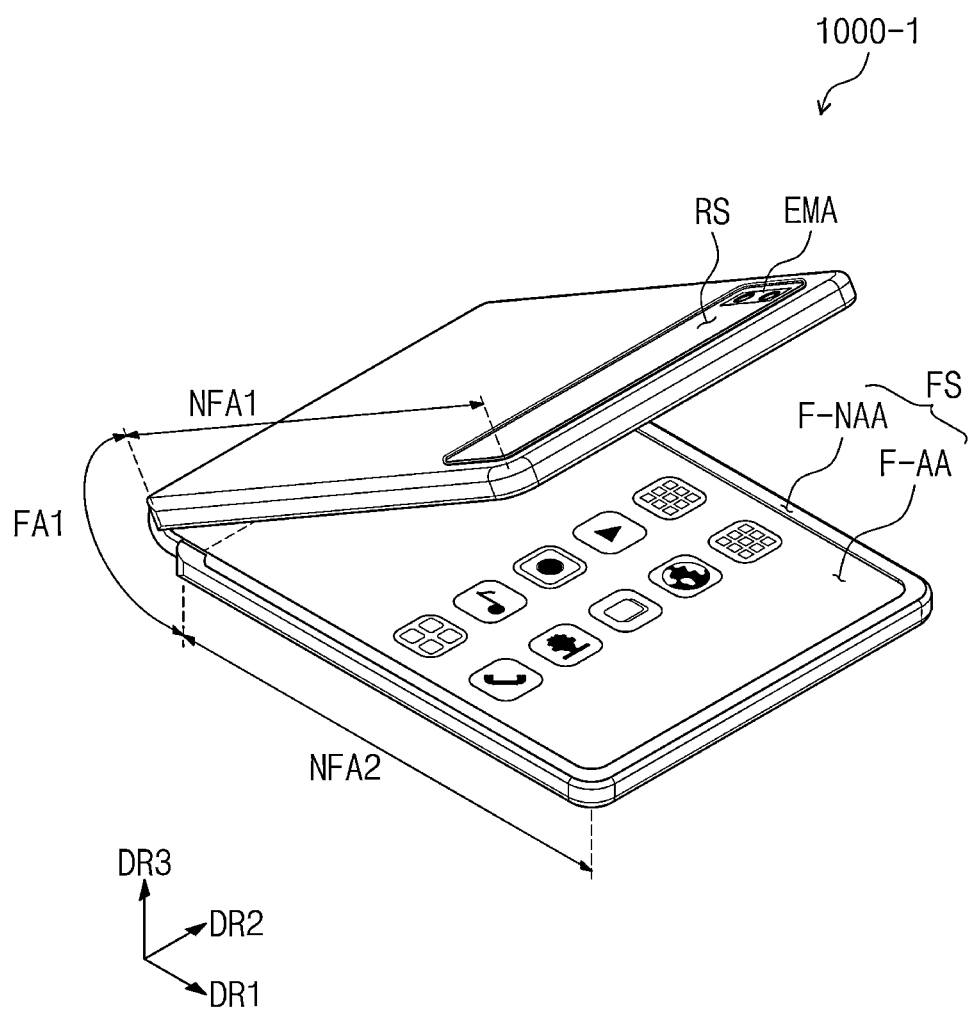
FIG. 2B is a perspective view illustrating a display device in an in-folded state, according to an embodiment of the disclosure.

FIG. 2A is a perspective view illustrating a display device in an unfolded state, according to an embodiment of the disclosure. FIG. 2B is a perspective view illustrating a display device illustrated in FIG. 2A in an in-folded state, according to an embodiment of the disclosure.

Referring to FIGS. 2A and 2B, an embodiment of a display device 1000-1 may display an image IM on a display surface FS defined on a plane parallel to each of the first direction DR1 and the second direction DR2, to face the third direction DR3. The display surface FS on which the image IM is displayed may correspond to a front surface of the display device 1000-1. The image IM may include a still image as well as a video (or a moving image). In an embodiment, for example, the image IM may include an Internet search window and a clock window are illustrated in FIG. 2A.

In an embodiment, a front surface (or an upper/top surface) and a rear surface (or a lower/bottom surface) of each component are defined with respect to a direction in which the image IM is displayed. The front surface and the rear surface may be opposite to each other in the third direction DR3, and the normal direction of each of the front surface and the rear surface may be parallel to the third direction DR3.

A separation distance between the front surface and the rear surface in the third direction DR3 may correspond to a thickness of the display device 1000-1 in the third direction DR3. Here, directions that the first, second, and third directions DR1, DR2, and DR3 indicate may be relative in concept and may be changed to different directions.

The display device 1000-1 may sense an external input applied from the outside. The external input may include various types of inputs that are provided from the outside of the display device 1000-1. In an embodiment, for example, the external input may include an external input (e.g., hovering) that is applied in a state of approaching the display device 1000-1 or in a state of being adjacent to the display device 1000-1 within a given distance as well as a contact by a part of the user's body such as the user's hand. In such an embodiment, the external input may be provided in various types such as force, pressure, temperature, and light.

The display device 1000-1 according to an embodiment may include a first display surface FS and a second display surface RS. The first display surface FS may include a first active area F-AA and a first surrounding area F-NAA.

The first active area F-AA may be an area that is activated depending on an electrical signal. The first active area F-AA may be an area in which the image IM is displayed and which is capable of sensing various types of external inputs. The first surrounding area F-NAA may be adjacent to the first active area F-AA. The first surrounding area F-NAA may have a given color. The first surrounding area F-NAA may surround the first active area F-AA. In an embodiment, the shape of the first active area F-AA may be defined substantially by the first surrounding area F-NAA. However, this is illustrated as an example, and the first surrounding area F-NAA may be disposed adjacent to only one side of the first active area F-AA or may be omitted. The display device 1000-1 according to an embodiment of the disclosure may include various shapes of active areas and is not limited to any one embodiment.

The second display surface RS may be defined as a surface that is opposite to (or faces away from) at least a portion of the first display surface FS. In an embodiment, the second display surface RS may be defined as a portion of the rear surface of the display device 1000-1. The second display surface RS may include an electronic module area EMA.

Various electronic modules may be disposed in the electronic module area EMA. In an embodiment, for example, the electronic module may include at least one selected from a camera, a speaker, a light sensor, and a thermal sensor. The electronic module area EMA may sense an external subject through the first display surface FS or the second display surface RS. The electronic module may include a plurality of components and is not limited to any one embodiment.

The display device 1000-1 may be in-folded or out-folded about a folding axis AX1. The folding axis AX1 may extend in the second direction DR2. That is, the folding axis AX1 may extend along a minor axis (or an axis in a width direction) of the display device 1000-1.

A plurality of areas may be defined in the display device 1000-1 depending on operation types. The plurality of areas may include a folding area FA1 and at least one non-folding area (e.g., NFA1 or NFA2). The folding area FA1 may be interposed between two non-folding areas NFA1 and NFA2.

The folding area FA1 that is an area folded about the folding area FA1 may be an area that substantially forms a curvature. The folding area FA1 may be a flexible area.

The non-folding areas NFA1 and NFA2 may include the first non-folding area NFA1 and the second non-folding area NFA2. The first non-folding area NFA1 may be adjacent to one side of the folding area FA1, and the second non-folding area NFA2 may be adjacent to an opposite side of the folding area FA1.

In an embodiment, a single folding area FA1 is defined in the display device 1000-1, but the disclosure is not limited thereto. In an alternative embodiment, for example, a plurality of folding areas may be defined in the display device 1000-1.

The first display surface FS may be visually perceived by the user when the display device 1000-1 is unfolded, and the second display surface RS may be visually perceived by the user, when the display device 1000-1 is folded.

The display device 1000-1 according to an embodiment of the disclosure may be driven in a normal mode in which an image is displayed in the second display surface RS normally or in a power-saving mode in which an image is displayed in the second display surface RS with a low power. The power-saving mode may refer to a driving scheme in which maximum luminance is limited to given luminance or lower such that power consumption is minimized. In an embodiment, for example, the power-saving mode may include an always-on-display (AOD) mode in which simple display information (e.g., a clock image) is always displayed, a predetermined display mode in which a screen is displayed with ultra-low luminance in a dark environment, etc.

Figure 3:
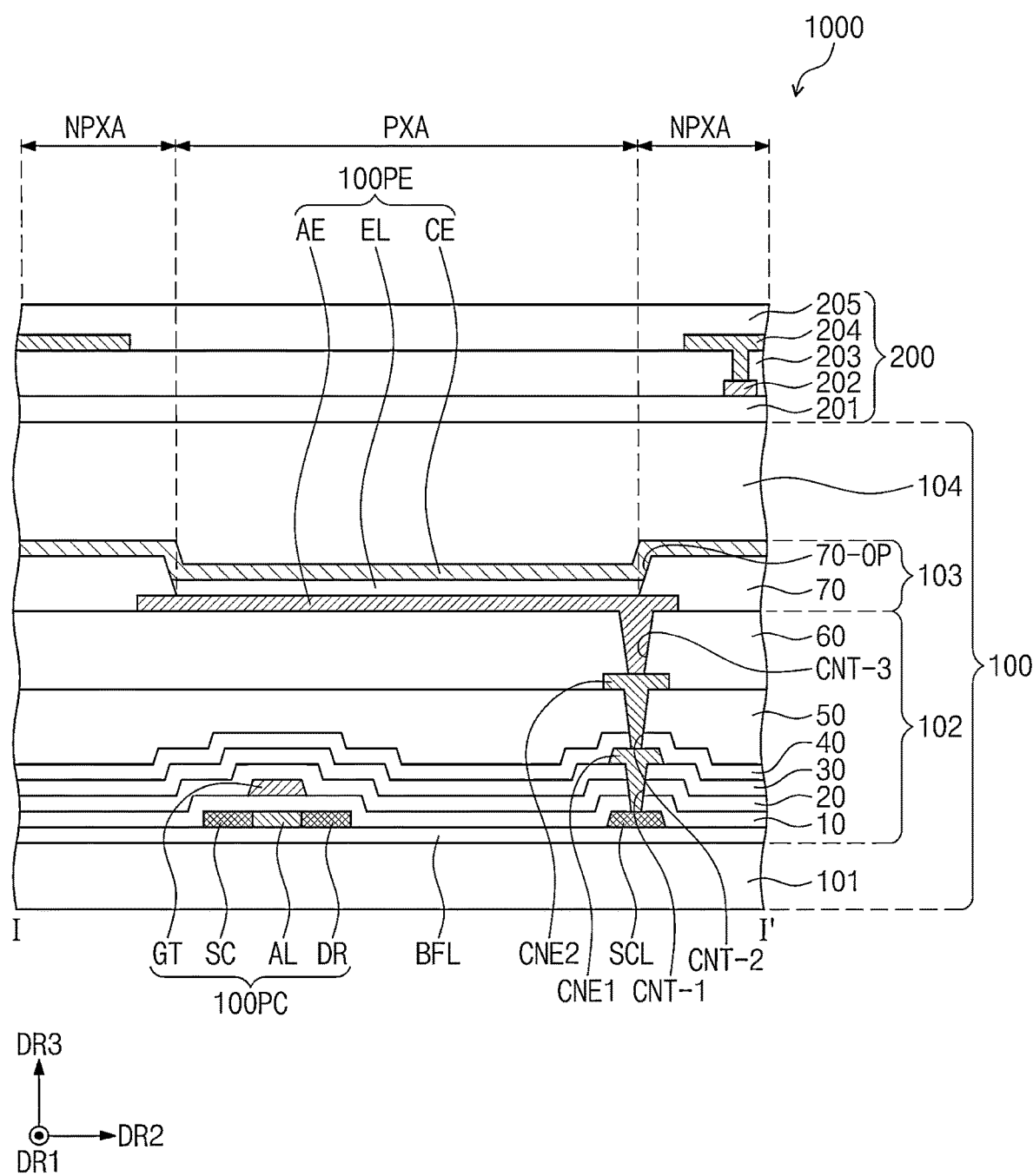
FIG. 3 is a cross-sectional view of a display device taken along line I-I' of FIG. 1B, according to an embodiment of the disclosure.

FIG. 3 is a cross-sectional view of a display device taken along line I-I' of FIG. 1B, according to an embodiment of the disclosure.

The cross section taken along line I-I' of FIG. 1B is illustrated in FIG. 3 as an example, but the structure of FIG. 3 according to an embodiment of the disclosure may correspond to the cross section of a partial area of the second display surface RS (refer to FIG. 2B).

Referring to FIG. 3, an embodiment of the display device 1000 may include the display layer 100 and the sensor layer 200. The display layer 100 may include a base layer 101, a circuit layer 102, a light emitting element layer 103, and an encapsulation layer 104.

The base layer 101 may be a member that provides a base surface on which the circuit layer 102 is disposed. The base layer 101 may be a glass substrate, a metal substrate, a polymer substrate, etc. However, the disclosure is not limited thereto. In an embodiment, for example, the base layer 101 may be an inorganic layer, an organic layer, or a composite material layer.

The base layer 101 may have a multi-layer structure. In an embodiment, for example, the base layer 101 may include a first synthetic resin layer, a silicon oxide (SiOx) layer disposed on the first synthetic resin layer, an amorphous silicon (a-Si) layer disposed on the silicon oxide layer, and a second synthetic resin layer disposed on the amorphous silicon layer. The silicon oxide layer and the amorphous silicon layer may be collectively referred to as a "base barrier layer". Alternatively, the base layer 101 may include a first synthetic resin layer, an adhesive layer, and a second synthetic resin layer.

Each of the first and second synthetic resin layers may include a polyimide-based resin. In an embodiment, for example, each of the first and second synthetic resin layers may include at least one selected from an acrylate-based resin, a methacrylate-based resin, a polyisoprene-based resin, a vinyl-based resin, an epoxy-based resin, a urethane-based resin, a cellulose-based resin, a siloxane-based resin, a polyamide-based resin, and a perylene-based resin. Here, the expression "~-based resin" in the specification indicates that "~-based resin" includes the functional group of "~".

The circuit layer 102 may be disposed on the base layer 101. The circuit layer 102 may include an insulating layer, a semiconductor pattern, a conductive pattern, a signal line, etc. An insulating layer, a semiconductor layer, and a conductive layer may be formed on the base layer 101 through a coating or deposition process, and the insulating layer, the semiconductor layer, and the conductive layer may be selectively patterned through a plurality of photolithography processes. Afterwards, the semiconductor pattern, the conductive pattern, the signal line, etc. included in the circuit layer 102 may be formed.

In an embodiment, at least one inorganic layer is disposed or formed on an upper surface of the base layer 101. The inorganic layer may include at least one selected from aluminum oxide, titanium oxide, silicon oxide, silicon nitride, silicon oxynitride, zirconium oxide, and hafnium oxide. The inorganic layer may include or be formed of multiple layers. The multiple inorganic layers may constitute a barrier layer and/or a buffer layer. In an embodiment, as shown in FIG. 3, the display layer 100 may include a buffer layer BFL provided as the at least one inorganic layer.

The buffer layer BFL may improve a bonding force between the base layer 101 and the semiconductor pattern. The buffer layer BFL may include a silicon oxide layer and a silicon nitride layer, and the silicon oxide layer and the silicon nitride layer may be alternately stacked.

The semiconductor pattern may be disposed on the buffer layer BFL. In an embodiment, the semiconductor pattern may include polysilicon. However, the disclosure is not limited thereto. In an alternative embodiment, for example, the semiconductor pattern may include amorphous silicon or metal oxide.

FIG. 3 only illustrates a portion of the semiconductor pattern, and the semiconductor pattern may be further disposed in another area. The semiconductor patterns may be arranged across pixels in a specific rule. An electrical property of the semiconductor pattern may vary depending on whether it is doped or not. The semiconductor pattern may include a doped area and an undoped area. The doped area may be doped with the N-type dopant or the P-type dopant. A P-type transistor may include an area doped with the P-type dopant, and an N-type transistor may include an area doped with the N-type dopant.

The doped area may be higher in conductivity than the undoped area and may substantially serve as an electrode or a signal line. The undoped area may substantially correspond to an active (or a channel) of a transistor. In other words, a portion of the semiconductor pattern may be an active area of the transistor, another portion of the semiconductor pattern may be a source area or a drain area of the transistor, and the other portion of the semiconductor pattern may be a connection electrode or a connection signal line.

Each pixel may be expressed by an equivalent circuit including 7 transistors, one capacitor, and a light emitting element, and an equivalent circuit diagram of the pixel may be modified in various forms. One transistor 100PC and one light emitting element 100PE that are included in one pixel are illustrated in FIG. 3 as an example.

A source SC, an active AL, and a drain DR of the transistor 100PC may be formed from (or defined by portions of) the semiconductor pattern. In a cross-sectional view, the source SC and the drain DR may extend from the active AL in directions being away from each other. A portion of a connection signal line SCL formed from the semiconductor pattern is illustrated in FIG. 3. Although not separately illustrated, the connection signal line SCL may be connected to the drain DR of the transistor 100PC in a plan view.

A first insulating layer 10 may be disposed on the buffer layer BFL. The first insulating layer 10 may overlap a plurality of pixels in common and may cover the semiconductor pattern. The first insulating layer 10 may be an inorganic layer and/or an organic layer and may have a single-layer or multi-layer structure. The first insulating layer 10 may include at least one selected from aluminum oxide, titanium oxide, silicon oxide, silicon nitride, silicon oxynitride, zirconium oxide, and hafnium oxide. In an embodiment, the first insulating layer 10 may be a single silicon oxide layer. Not only the first insulating layer 10 but also an insulating layer of the circuit layer 102 to be described later may be an inorganic layer and/or an organic layer and may have a single-layer structure or a multi-layer structure. The inorganic layer may include at least one selected from the above materials, but is not limited thereto.

A gate GT of the transistor 100PC is disposed on the first insulating layer 10. The gate GT may be a portion of a metal pattern. The gate GT overlaps the active AL. The gate GT may function as a mask in the process of doping the semiconductor pattern.

A second insulating layer 20 may be disposed on the first insulating layer 10 and may cover the gate GT. The second insulating layer 20 may overlap the pixels in common. The second insulating layer 20 may be an inorganic layer and/or an organic layer and may have a single-layer or a multi-layer structure. In an embodiment, the second insulating layer 20 may be a single silicon oxide layer or a single silicon nitride layer.

A third insulating layer 30 may be disposed on the second insulating layer 20. In an embodiment, the third insulating layer 30 may be a single silicon oxide layer or a single silicon nitride layer.

A first connection electrode CNE1 may be disposed on the third insulating layer 30. The first connection electrode CNE1 may be connected to the connection signal line SCL through a contact hole CNT-1 defined in the first, second, and third insulating layers 10, 20, and 30.

A fourth insulating layer 40 may be disposed on the third insulating layer 30. The fourth insulating layer 40 may be a single silicon oxide layer. A fifth insulating layer 50 may be disposed on the fourth insulating layer 40. The fifth insulating layer 50 may be an organic layer.

A second connection electrode CNE2 may be disposed on the fifth insulating layer 50. The second connection electrode CNE2 may be connected to the first connection electrode CNE1 through a contact hole CNT-2 defined in the fourth insulating layer 40 and the fifth insulating layer 50.

A sixth insulating layer 60 may be disposed on the fifth insulating layer 50 and may cover the second connection electrode CNE2. The sixth insulating layer 60 may be an organic layer.

The light emitting element layer 103 may be disposed on the circuit layer 102. The light emitting element layer 103 may include the light emitting element 100PE. In an embodiment, for example, the light emitting element layer 103 may be an organic light emitting material, a quantum dot, a quantum rod light emitting diode (LED), or a micro LED. Hereinafter, for convenience of description, embodiments in which the light emitting element 100PE is an organic light emitting element will be described, but the light emitting element 100PE is not particularly limited thereto.

The light emitting element 100PE includes a first electrode AE, an emission layer EL, and a second electrode CE.

The first electrode AE may be disposed on the sixth insulating layer 60. The first electrode AE may be connected to the second connection electrode CNE2 through a contact hole CNT-3 defined in the sixth insulating layer 60.

A pixel defining layer 70 may be disposed on the sixth insulating layer 60 and may cover a portion of the first electrode AE. An opening 70-OP is defined in the pixel defining layer 70. The opening 70-OP of the pixel defining layer 70 exposes at least a portion of the first electrode AE.

In an embodiment, as illustrated in FIG. 3, the active area 1000A (refer to FIG. 1A) may include an emission area PXA and a non-emission area NPXA adjacent to the emission area PXA. The non-emission area NPXA may surround the emission area PXA. In an embodiment, the emission area PXA is defined to correspond to the portion of the first electrode AE, which is exposed by the opening 70-OP.

The emission layer EL may be disposed on the first electrode AE. The emission layer EL may be disposed in the area defined by the opening 70-OP. That is, the emission layer EL may be independently defined or formed for each pixel. In the case where the emission layer EL is independently defined or formed for each pixel, each of the emission layers EL may emit a light of at least one selected from a blue color, a red color, and a green color. However, the disclosure is not limited thereto, and the emission layer EL may be connected to the pixels in common. In this case, the emission layer EL may provide a blue light or may provide a white light.

The second electrode CE may be disposed on the emission layer EL. The second electrode CE may have an integrated shape and may be disposed in the plurality of pixels in common.

Although not illustrated, a hole control layer may be interposed between the first electrode AE and the emission layer EL. The hole control layer may be disposed in common in the emission area PXA and the non-emission area NPXA. The hole control layer may include a hole transport layer and may further include a hole injection layer. An electron control layer may be interposed between the emission layer EL and the second electrode CE. The electron control layer may include an electron transport layer and may further include an electron injection layer. The hole control layer and the electron control layer may be formed, in common, in the plurality of pixels by using an open mask.

The encapsulation layer 104 may be disposed on the light emitting element layer 103. The encapsulation layer 104 may include an inorganic layer, an organic layer, and an inorganic layer sequentially stacked, and layers constituting the encapsulation layer 104 are not limited thereto.

The inorganic layers may protect the light emitting element layer 103 from moisture and oxygen, and the organic layer may protect the light emitting element layer 103 from a foreign material such as dust particles. The inorganic layers may include a silicon nitride layer, a silicon oxynitride layer, a silicon oxide layer, a titanium oxide layer, an aluminum oxide layer, etc. The organic layer may include an acrylic-based organic layer but is not limited thereto.

The sensor layer 200 may include a base layer 201, a first conductive layer 202, a sensing insulating layer 203, a second conductive layer 204, and a cover insulating layer 205.

The base layer 201 may be an inorganic layer including at least one selected from silicon nitride, silicon oxynitride, and silicon oxide. Alternatively, the base layer 201 may be an organic layer including epoxy resin, acrylate resin, or imide-based resin. The base layer 201 may have a single-layer structure or may have a structure in which multiple layers are stacked in the third direction DR3.

Each of the first conductive layer 202 and the second conductive layer 204 may have a single-layer structure or may have a structure in which multiple layers are stacked in the third direction DR3.

A conductive layer of the single-layer structure may include a metal layer or a transparent conductive layer. The metal layer may include molybdenum, silver, titanium, copper, aluminum, or an alloy thereof. The transparent conductive layer may include transparent conductive oxide such as indium tin oxide (ITO), indium zinc oxide (IZO), zinc oxide (ZnO), or indium zinc tin oxide (IZTO). In addition, the transparent conductive layer may include a conductive polymer such as poly(3,4-ethylenedioxythiophene) (PEDOT), a metal nanowire, a graphene, etc.

The conductive layer of the multi-layer structure may include metal layers. In an embodiment, for example, the metal layers may have a three-layer structure of titanium/aluminum/titanium. The conductive layer of the multi-layer structure may include at least one metal layer and at least one transparent conductive layer.

In an embodiment where the first conductive layer 202 and the second conductive layer 204 include a metal layer, the first conductive layer 202 and the second conductive layer 204 may be opaque. Accordingly, the first conductive layer 202 and the second conductive layer 204 may be patterned not to overlap the emission area PXA.

At least one selected from the sensing insulating layer 203 and the cover insulating layer 205 may include an inorganic layer. The inorganic layer may include at least one selected from aluminum oxide, titanium oxide, silicon oxide, silicon nitride, silicon oxynitride, zirconium oxide, and hafnium oxide.

At least one selected from the sensing insulating layer 203 and the cover insulating layer 205 may include an organic layer. The organic film may include at least one selected from acrylic-based resin, methacrylic-based resin, polyisoprene, vinyl-based resin, epoxy-based resin, urethane-based resin, cellulose-based resin, siloxane-based resin, polyimide-based resin, polyamide-based resin, and perylene-based resin.

Figure 4:
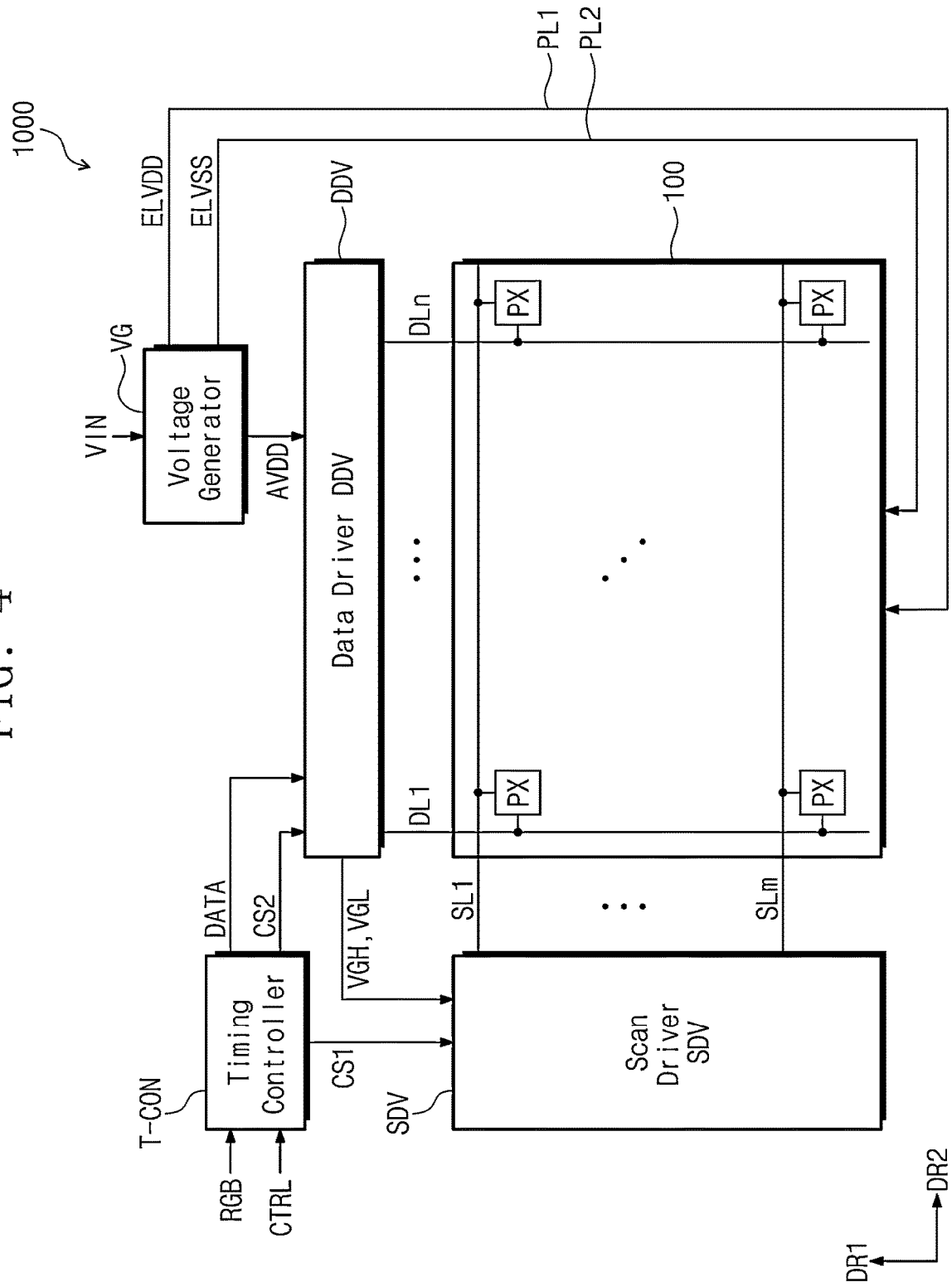
FIG. 4 is a block diagram of a display device according to an embodiment of the disclosure.

FIG. 4 is a block diagram of a display device according to an embodiment of the disclosure.

Referring to FIG. 4, an embodiment of the display device 1000 may include the display layer 100, a scan driver SDV, a data driver DDV, a timing controller T-CON, and a voltage generator VG.

The display layer 100 may include a plurality of pixels PX, a plurality of scan lines SL1 to SLm, and a plurality of data lines DLI to DLn. Herein, "m" and "n" are natural numbers. The plurality of pixels PX may be arranged in the first direction DR1 and the second direction DR2 to be disposed in a matrix shape, but the arrangement of the plurality of pixels PX is not limited thereto.

The plurality of scan lines SL1 to SLm may extend in the second direction DR2 and may be connected to the plurality of pixels PX and the scan driver SDV. The plurality of data lines DLI to DLn may extend in the first direction DR1 and may be connected to the plurality of pixels PX and the data driver DDV.

The voltage generator VG may receive an input voltage VIN from a power device such as a battery. The voltage generator VG may generate a first driving voltage ELVDD, a second driving voltage ELVSS, and a third driving voltage AVDD.

The voltage generator VG may provide the first driving voltage ELVDD and the second driving voltage ELVSS to the display layer 100. The voltage level of the first driving voltage ELVDD may be higher than the voltage level of the second driving voltage ELVSS. The first driving voltage ELVDD may be provided to the display layer 100 through a first power line PL1. The second driving voltage ELVSS may be provided to the display layer 100 through a second power line PL2.

The first driving voltage ELVDD and the second driving voltage ELVSS may be provided to the plurality of pixels PX. The first power line PL1 and the second power line PL2 may extend into the display layer 100 and may be connected to the plurality of pixels PX. The first driving voltage ELVDD and the second driving voltage ELVSS may be respectively transferred through the first power line PL1 and the second power line PL2 to be provided to each of the plurality of pixels PX. The plurality of pixels PX may be driven by the first driving voltage ELVDD and the second driving voltage ELVSS.

The voltage generator VG may provide the third driving voltage AVDD to the data driver DDV. The third driving voltage AVDD may be a source driving voltage for the data driver DDV. The data driver DDV may generate a high voltage VGH and a low voltage VGL by using the third driving voltage AVDD. The data driver DDV may provide the high voltage VGH and the low voltage VGL to the scan driver SDV.

The scan driver SDV may operate based on the high voltage VGH and the low voltage VGL provided from the data driver DDV. In an embodiment, for example, the high voltage VGH may have a voltage level for turning on the transistors of the scan driver SDV, and the low voltage VGL may have a voltage level for turning off the transistors of the scan driver SDV.

The timing controller T-CON may receive an image signal RGB and a control signal CTRL from the outside (e.g., a system board). The timing controller T-CON may generate image data "DATA" by converting the data format of the image signal RGB so as to be suitable for the interface specification of the data driver DDV. The timing controller T-CON may provide the data driver DDV with the image data "DATA" whose data format is converted.

The timing controller T-CON may generate and output a first control signal CS1 and a second control signal CS2 in response to the control signal CTRL provided from the outside. The first control signal CS1 may be provided to the scan driver SDV. The second control signal CS2 may be provided to the data driver DDV.

The scan driver SDV may generate a plurality of scan signals in response to the first control signal CS1. The plurality of scan signals may be applied to the plurality of pixels PX through the plurality of scan lines SL1 to SLm respectively corresponding thereto.

The data driver DDV may generate a plurality of data voltages corresponding to the image data "DATA" in response to the second control signal CS2. The plurality of data voltages may be applied to the plurality of pixels PX through the plurality of data lines DL1 to DLn respectively corresponding thereto.

The plurality of pixels PX may receive the plurality of data voltages in response to the plurality of scan signals. The plurality of pixels PX may display an image by emitting a light of luminance corresponding to the plurality of data voltages.

Figure 5:
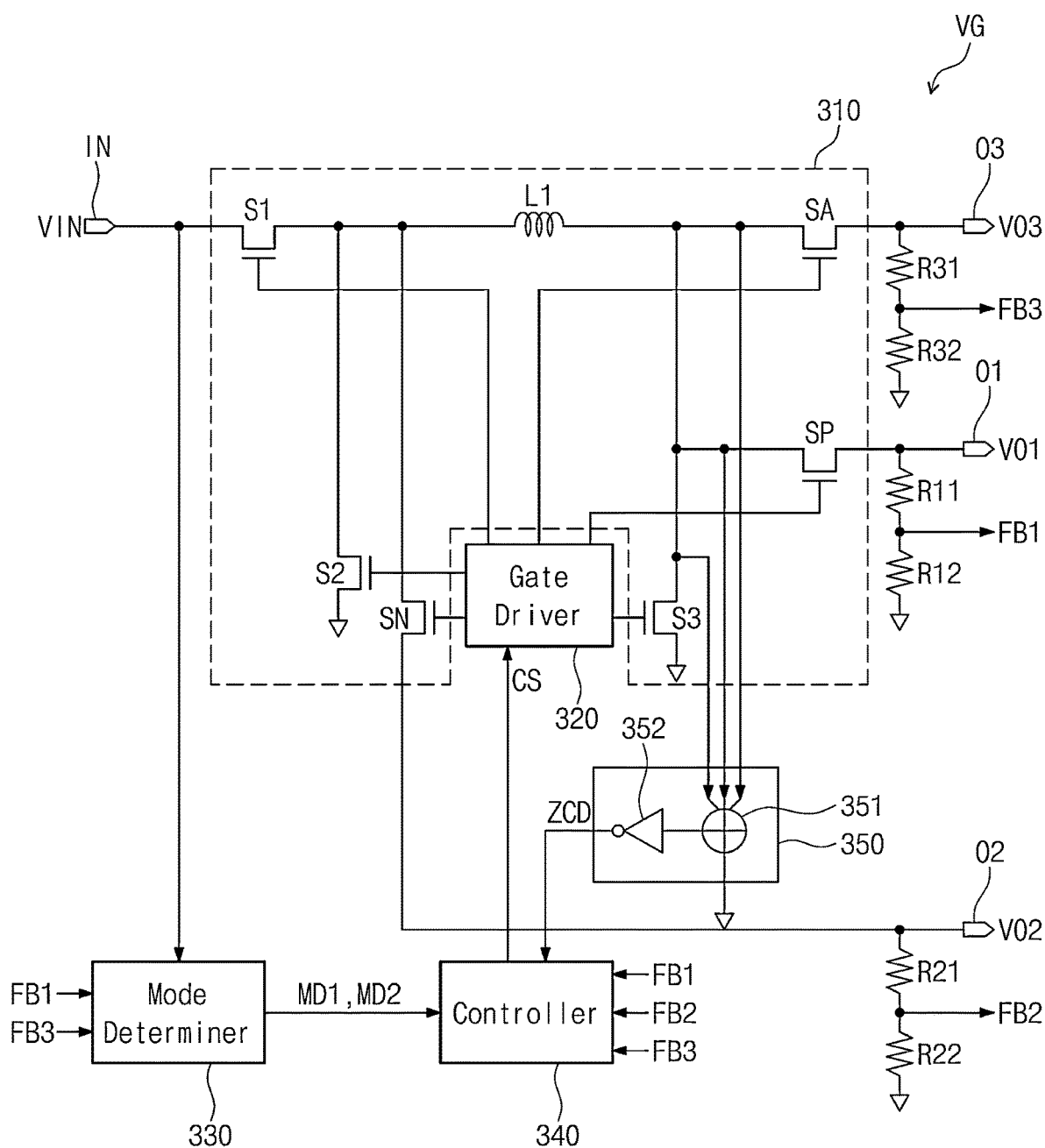
FIG. 5 is a block diagram illustrating a voltage generator according to an embodiment of the disclosure.

FIG. 5 is a block diagram illustrating a voltage generator according to an embodiment of the disclosure.

Referring to FIGS. 4 and 5, an embodiment of the voltage generator VG may include a single inductive element 310, a gate driver 320, a mode determiner 330, a controller 340, and a zero-current detector 350.

The single inductive element 310 may perform a direct current-to-direct current (DC-DC) conversion on the input voltage VIN to generate a first output voltage VO1, a second output voltage VO2, and a third output voltage VO3.

The single inductive element 310 may be defined by a plurality of converters that are respectively connected to a first output terminal O1 from which the first output voltage VO1 is output, a second output terminal O2 from which the second output voltage VO2 is output, and a third output terminal O3 from which the third output voltage VO3 is output.

The voltage level of each of the plurality of output voltages VO1, VO2, and VO3 may be higher or lower than the voltage level of the input voltage VIN. In an embodiment, for example, when the first output voltage VO1 is converted from the input voltage VIN in a way such that the voltage level of the first output voltage VO1 is lower than the voltage level of the input voltage VIN, the single inductive element 310 may be understood as performing a function of a buck converter or a step-down converter. In such an embodiment, when the first output voltage VO1 is converted from the input voltage VIN in a way such that the voltage level of the first output voltage VO1 is higher than the voltage level of the input voltage VIN, the single inductive element 310 may be understood as performing a function of a boost converter or a step-up converter.

The plurality of output voltages VO1, VO2, and VO3 may be respectively output through the plurality of output terminals O1, O2, and O3, independently of each other. The voltage level of each of the plurality of output voltages VO1, VO2, and VO3 may be higher or lower than the voltage level of the input voltage VIN, depending on a requirement of a relevant component. In an embodiment, for example, regardless of whether the voltage level of the first output voltage VO1 is higher or lower than the voltage level of the input voltage VIN, the single inductive element 310 may output the second output voltage VO2 whose voltage level is higher or lower than the voltage level of the input voltage VIN. In an embodiment, the single inductive element 310 may perform a function of a buck-boost converter.

Each of the first output voltage VO1 and the third output voltage VO3 may be generated in a first mode being a buck mode or a second mode being a buck-boost mode.

The first driving voltage ELVDD may be generated based on (or corresponding to) the first output voltage VO1 output through the first output terminal O1. That is, the single inductive element 310 may convert the input voltage VIN into the first driving voltage ELVDD to be output to the first output terminal O1.

The third driving voltage AVDD may be generated based on (or corresponding to) the third output voltage VO3 output through the third output terminal O3. That is, the single inductive element 310 may convert the input voltage VIN into the third driving voltage AVDD to be output to the third output terminal O3.

In an embodiment, for example, components that operates in a mode determined by the control signal CS output from the controller 340 may be components that output the first output voltage VO1 and the third output voltage VO3.

The second output voltage VO2 may be generated when the single inductive element 310 is driven in an inverting buck-boost mode.

In an embodiment, the gate driver 320 may turn on a first transistor S1 and a third transistor S3 during a first period in the inverting buck-boost mode to generate the second output voltage VO2 to be output to the second output terminal O2 in the inverting buck-boost mode. During a second period following the first period in the inverting buck-boost mode, the gate driver 320 may turn on the third transistor S3 and a fifth transistor SN.

The second driving voltage ELVSS may be generated based on (or corresponding to) the second output voltage VO2 output through the second output terminal O2. That is, the single inductive element 310 may convert the input voltage VIN into the second driving voltage ELVSS to be output to the second output terminal O2. The voltage level of the second driving voltage ELVSS may be lower than the voltage level of the first driving voltage ELVDD.

In an embodiment, the single inductive element 310 may include an inductor L1 and a plurality of switches S1, S2, S3, SP, SA, and SN connected to the inductor L1. In this case, the single inductive element 310 may be referred to as a "single inductor multiple output (SIMO)".

In a case of using a circuit for a conventional DC-DC conversion, a conversion circuit may be added for each of the output voltages VO1, VO2, and VO3. In this case, because an inductor is added for each of the output voltages VO1, VO2, and VO3, the layout area of (or a planar size of) the voltage generator VG may increase, and manufacturing costs of the voltage generator VG may increase. According to an embodiment of the disclosure, the single inductive element 310 may generate the plurality of output voltages VO1, VO2, and VO3 by performing a DC-DC conversion on the input voltage VIN by using only one inductor L1. The plurality of output voltages VO1, VO2, and VO3 may be respectively output to the plurality of output terminals O1, O2, and O3 without the increase in the layout area and manufacturing costs of the voltage generator VG. In such an embodiment, where the layout area decreases, the electromagnetic interference (EMI) between circuit elements may be effectively prevented. Accordingly, the voltage generator VG with improved reliability and the display device 1000 (refer to FIG. 1) including the voltage generator VG may be provided.

The plurality of switches S1, S2, S3, SP, SA, and SN may be controlled by signals provided from the gate driver 320. The plurality of switches S1, S2, S3, SP, SA, and SN may include a first transistor S1, a second transistor S2, a third transistor S3, a fourth transistor SP, a fifth transistor SN, and a sixth transistor SA.

The first transistor S1 may be connected between an input terminal IN, to which the input voltage VIN is input, and a first end of the inductor L1, and may include a gate electrically connected to the gate driver 320.

The second transistor S2 may be connected between the first end of the inductor L1 and a ground terminal, and may include a gate electrically connected to the gate driver 320.

The third transistor S3 may be connected between a second end of the inductor L1 and the ground terminal, and may include a gate electrically connected to the gate driver 320.

The fourth transistor SP may be connected between the second end of the inductor L1 and the first output terminal O1, and may include a gate electrically connected to the gate driver 320.

The fifth transistor SN may be connected between the first end of the inductor L1 and the second output terminal O2, and may include a gate electrically connected to the gate driver 320.

The sixth transistor SA may be connected between the second end of the inductor L1 and the third output terminal O3, and may include a gate electrically connected to the gate driver 320.

A first resistor R11 and a second resistor R12 may be connected in series between the first output terminal O1 and the ground terminal. The first resistor R11 and the second resistor R12 may divide the first output voltage VO1 to generate a first feedback voltage FB1. The first feedback voltage FB1 may be adjusted in proportion to resistance values of the first resistor R11 and the second resistor R12. For example, when the first resistor R11 and the second resistor R12 have a same resistance value as each other, the voltage level of the first feedback voltage FB1 may be half the voltage level of the first output voltage VO1.

A first resistor R21 and a second resistor R22 may be connected in series between the second output terminal O2 and the ground terminal. The first resistor R21 and the second resistor R22 may divide the second output voltage VO2 to generate a second feedback voltage FB2. The second feedback voltage FB2 may be adjusted in proportion to resistance values of the first resistor R21 and the second resistor R22.

A first resistor R31 and a second resistor R32 may be connected in series between the third output terminal O3 and the ground terminal. The first resistor R31 and the second resistor R32 may divide the third output voltage VO3 to generate a third feedback voltage FB3. The third feedback voltage FB3 may be adjusted in proportion to resistance values of the first resistor R31 and the second resistor R32.

The gate driver 320 may control the single inductive element 310. The gate driver 320 may provide driving signals to the first to sixth transistors S1, S2, S3, SP, SA, and SN, respectively, such that the first to sixth transistors S1, S2, S3, SP, SA, and SN are respectively turned on or turned off. The gate driver 320 may output a gate control signal for controlling a turn-on or turn-off for each of the first to sixth transistors S1, S2, S3, SP, SA, and SN such that the single inductive element 310 operates in a first mode or in a second mode different from the first mode.

The mode determiner 330 may receive the input voltage VIN, the first feedback voltage FB1, and the third feedback voltage FB3. The mode determiner 330 may output mode signals MD1 and MD2.

The mode signals MD1 and MD2 may include the first mode signal MD1 and the second mode signal MD2.

The controller 340 may receive the mode signals MD1 and MD2, a zero-current signal ZCD, the first feedback voltage FB1, the second feedback voltage FB2, and the third feedback voltage FB3. The controller 340 may output the control signal CS for controlling the gate driver 320 to the gate driver 320. The control signal CS may control the single inductive element 310 to be driven in the first mode or the second mode. That is, the gate driver 320 may control the single inductive element 310 to be driven in the first mode or the second mode in response to the control signal CS.

The controller 340 may control the gate driver 320 to drive the single inductive element 310 in a first driving mode, a second driving mode, or a third driving mode using the control signal CS.

In the first driving mode, the controller 340 may generate the control signal CS based on the mode signals MD1 and MD2 and the zero-current signal ZCD. This will be described later. The first driving mode may be applied to the display device 1000 (refer to FIG. 1) whose maximum luminance is relatively high. In an embodiment, for example, that the maximum luminance is relatively high may mean that the luminance of the display layer 100 (refer to FIG. 3) is 1000 candelas per square meter (cd/m$^2$) or greater.

In the second driving mode, the controller 340 may generate the control signal CS based on the mode signals MD1 and MD2. This will be described later. The second driving mode may be applied to the display device 1000 (refer to FIG. 2) whose maximum luminance is relatively low. In an embodiment, for example, that the maximum luminance is relatively low may mean that the luminance of the display layer 100 (refer to FIG. 3) is less than 1000 cd/m$^2$.

In the third driving mode, the controller 340 may generate the control signal CS in a way such that the single inductive element 310 is driven only in the buck-boost mode being the second mode. The third driving mode may be applied to the display device 1000 (refer to FIG. 1) such as a type of display device vulnerable to a flicker phenomenon or a type thereof in which the decrease in the number of parts is desired due to layout constraints.

According to an embodiment of the disclosure, the controller 340 may select an appropriate driving mode for each product family of the display device 1000 (refer to FIG. 1). That is, the controller 340 may select a driving method capable of improving power consumption or a driving method capable of improving the quality of display depending on a model and may operate depending on a selected driving method. In an embodiment, for example, the controller 340 may operate in the first driving mode to make the flicker phenomenon better in the display device 1000 (refer to FIG. 1) with the maximum luminance being relatively high, or the controller 340 may operate in the second driving mode to improve efficiency in the display device 1000 (refer to FIG. 1) with the maximum luminance being relatively low. Accordingly, the voltage generator VG with improved reliability and the display device 1000 (refer to FIG. 1) including the voltage generator VG may be provided.

The zero-current detector 350 may be connected to the single inductive element 310. The zero-current detector 350 may output the zero-current signal ZCD to the controller 340. The zero-current detector 350 may detect a current of the inductor L1.

The zero-current detector 350 may include an adder module 351 and a logic circuit 352. The adder module 351 may be electrically connected to the third transistor S3, the fourth transistor SP, and the sixth transistor SA that are connected to the second end of the inductor L1. The adder module 351 may be connected to the logic circuit 352. The logic circuit 352 may invert a phase of a received signal and may output the zero-current signal ZCD. The zero-current signal ZCD may indicate whether the current of the inductor L1 has a zero value. In an embodiment, for example, the zero-current detector 350 may determine whether the current of the inductor L1 is greater or less than "0".

Figure 6:
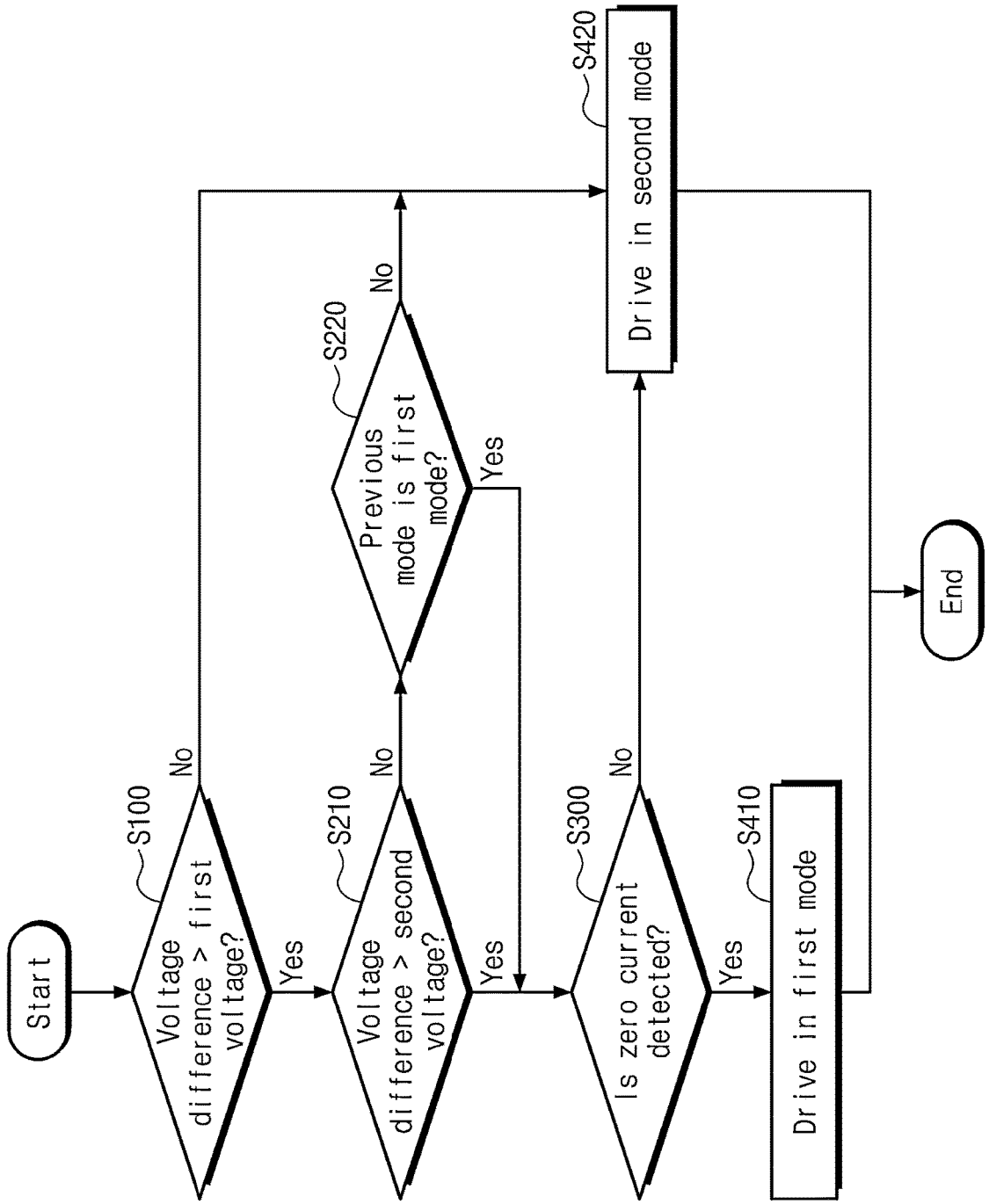
FIG. 6 is a flowchart illustrating a driving method of a voltage generator operating in a first mode, according to an embodiment of the disclosure.

FIG. 6 is a flowchart illustrating a driving method of a voltage generator operating in a first mode, according to an embodiment of the disclosure.

Referring to FIGS. 5 and 6, the voltage generator VG may operate in the first driving mode. The mode determiner 330 may receive the first feedback voltage FB1. The mode determiner 330 may calculate the first output voltage VO1 based on the first feedback voltage FB1. The mode determiner 330 may calculate a difference between the input voltage VIN and the first output voltage VO1.

The mode determiner 330 may receive the second feedback voltage FB2. The mode determiner 330 may calculate the second output voltage VO2 based on the second feedback voltage FB2. The mode determiner 330 may calculate a difference between the input voltage VIN and the second output voltage VO2.

The mode determiner 330 may calculate a voltage difference between the input voltage VIN and the first output voltage VO1 or the second output voltage VO2, that is, a voltage difference between the input voltage VIN and the first output voltage VO1 or between the input voltage VIN and the second output voltage VO2.

The mode determiner 330 may output the first mode signal MD1 and the second mode signal MD2 to the controller 340.

The mode determiner 330 may compare the voltage difference with a first voltage determined in advance (S100).

In an embodiment, for example, the first voltage may be 0.2 volt (V). However, this is an example, and the voltage level of the first voltage according to an embodiment of the disclosure may be variously provided without limitation thereto.

When the voltage difference is less or equal to the first voltage, the mode determiner 330 may output the second mode signal MD2. The controller 340 that receives the second mode signal MD2 may output the control signal CS to the gate driver 320 in a way such that the single inductive element 310 is driven in the second mode (S420).

When the voltage difference exceeds the first voltage, the mode determiner 330 may compare the voltage difference with a second voltage determined in advance (S210).

The voltage level of the second voltage may be higher than the voltage level of the first voltage. In an embodiment, for example, the second voltage may be 0.4 V. However, this is an example, and the voltage level of the second voltage according to an embodiment of the disclosure may be variously provided without limitation thereto.

When the voltage difference is less than or equal to the second voltage, the mode determiner 330 may check a previous mode of the single inductive element 310 (S220). In this case, when the previous mode of the single inductive element 310 is the second mode, the mode determiner 330 may output the second mode signal MD2. The controller 340 that receives the second mode signal MD2 may output the control signal CS to the gate driver 320 in a way such that the single inductive element 310 is driven in the second mode (S420).

That is, the second mode signal MD2 may be output when the voltage difference is less than or equal to the first voltage or when the voltage difference exceeds the first voltage and is less than or equal to the second voltage and the previous mode of the single inductive element 310 is the second mode. When the controller 340 receives the second mode signal MD2, regardless of whether a zero current is detected, the controller 340 may output the control signal CS to the gate driver 320 in a way such that the single inductive element 310 is driven in the second mode (S420).

According to an embodiment of the disclosure, when the voltage difference exceeds the first voltage and is less than or equal to the second voltage, that is, when the voltage difference belongs to (or is in) a boundary zone or range, the mode determiner 330 may output the mode signal MD1 or MD2 in a way such that the single inductive element 310 is driven to be identical to the previous mode thereof. Accordingly, in such an embodiment, an abnormal operation of the voltage generator VG, which may be caused in the boundary zone, may be effectively prevented. Accordingly, the voltage generator VG with improved reliability and the display device 1000 (refer to FIG. 1) including the voltage generator VG may be provided.

The second mode may be the buck-boost mode.

In an embodiment, the gate driver 320 may turn on the first transistor S1 and the third transistor S3 during a first period in the buck-boost mode to generate the first output voltage VO1 to be output to the first output terminal O1 in the buck-boost mode. During a second period following the first period in the buck-boost mode, the gate driver 320 may turn on the first transistor S1 and the fourth transistor SP. During a third period following the second period in the buck-boost mode, the gate driver 320 may turn on the second transistor S2 and the fourth transistor SP.

In an embodiment, the gate driver 320 may turn on the first transistor S1 and the third transistor S3 during the first period in the buck-boost mode to generate the third output voltage VO3 to be output to the third output terminal O3 in the buck-boost mode. During the second period following the first period in the buck-boost mode, the gate driver 320 may turn on the first transistor S1 and the sixth transistor SA. During the third period following the second period in the buck-boost mode, the gate driver 320 may turn on the second transistor S2 and the sixth transistor SA.

When the voltage difference exceeds the second voltage, the mode determiner 330 may output the first mode signal MD1.

When the voltage difference exceeds the first voltage and is less than or equal to the second voltage, the mode determiner 330 may check a previous mode of the single inductive element 310 (S220). In this case, when the previous mode of the single inductive element 310 is the first mode, the mode determiner 330 may output the first mode signal MD1.

That is, the first mode signal MD1 may be output when the voltage difference exceeds the first voltage and the second voltage higher in voltage level than the first voltage or when the voltage difference exceeds the first voltage and is less than or equal to the second voltage and the previous mode of the single inductive element 310 is the first mode.

The controller 340 that receives the first mode signal MD1 may determine whether a zero-current is detected, based on the zero-current signal ZCD received from the zero-current detector 350 (S300).

When it is determined based on the zero-current signal ZCD that the zero-current is not detected, the controller 340 may output the control signal CS to the gate driver 320 in a way such that the single inductive element 310 is driven in the second mode (S420).

When it is determined based on the zero-current signal ZCD that the zero-current is detected, the controller 340 may output the control signal CS to the gate driver 320 in a way such that the single inductive element 310 is driven in the first mode (S410).

The first mode may be the buck mode.

In an embodiment, the gate driver 320 may turn on the first transistor S1 and the fourth transistor SP during a first period in the buck mode to generate the first output voltage VO1 to be output to the first output terminal O1 in the buck mode. During a second period following the first period in the buck mode, the gate driver 320 may turn on the second transistor S2 and the fourth transistor SP.

In an embodiment, the gate driver 320 may turn on the first transistor S1 and the sixth transistor SA during the first period in the buck mode to generate the third output voltage VO3 to be output to the third output terminal O3 in the buck mode. During the second period following the first period in the buck mode, the gate driver 320 may turn on the second transistor S2 and the sixth transistor SA.

That is, in the first driving mode, the controller 340 may receive the zero-current signal ZCD from the zero-current detector 350 and may consider the zero-current signal ZCD for mode determination. When the zero current is detected in a state where the voltage difference exceeds the second voltage, the controller 340 may determine that the load is relatively small and may drive the single inductive element 310 in the first mode, and when the zero current is not detected in a state where the voltage difference exceeds the second voltage, the controller 340 may determine that the load is relatively large and may drive the single inductive element 310 in the second mode.

According to an embodiment of the disclosure, the voltage generator VG may determine the lightness and heaviness of the load through the zero-current detector 350. When the load is light, the controller 340 may operate in the buck mode higher in efficiency than the buck-boost mode to improve power consumption. Accordingly, the voltage generator VG capable of reducing power consumption and the display device 1000 (refer to FIG. 1) including the voltage generator VG may be provided. In an embodiment, when the load is heavy, the controller 340 may operate in the buck-boost mode in which the ripple of the second driving voltage ELVSS decreases compared to the buck mode to secure stability. In such an embodiment, the flicker of the image displayed in the display layer 100 (refer to FIG. 3) may decrease. Accordingly, the voltage generator VG with improved display quality and the display device 1000 (refer to FIG. 1) including the voltage generator VG may be provided.

Figure 7:
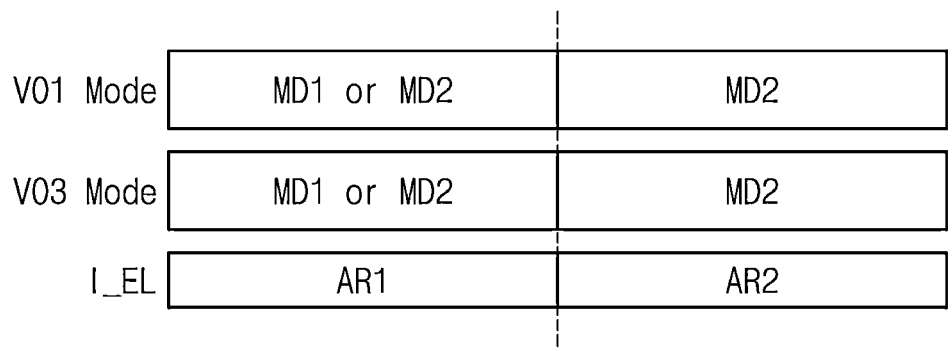
FIG. 7 is a block diagram illustrating an operation of a voltage generator operating in a first driving mode, according to an embodiment of the disclosure.

FIG. 7 is a block diagram illustrating an operation of a voltage generator operating in a first driving mode, according to an embodiment of the disclosure.

Referring to FIGS. 5 and 7, in an embodiment, the voltage generator VG may operate in the first driving mode.

A current I_EL may be proportional to the luminance of the display layer 100 (refer to FIG. 3). In an embodiment, as it goes from a first area AR1 toward a second area AR2, the current may gradually increase.

The first area AR1 may be a light load area. The first area AR1 may correspond to a period in which the voltage generator VG operates in a pulse frequency modulation (PFM) manner. The pulse frequency modulation manner that is applied to the voltage generator VG may be desired in that power loss is small under the light load condition.

The second area AR2 may be a heavy load area. The second area AR2 may correspond to a period in which the voltage generator VG operates in a pseudo continuous conduction mode (PCCM) manner. The pseudo continuous conduction mode may support the heavy load.

According to an embodiment of the disclosure, the operation of the voltage generator VG in the pseudo continuous conduction mode may prevent the cross regulation that a change in an output voltage of one load causes a change in an output voltage of another load. Accordingly, the voltage generator VG with improved display quality and the display device 1000 (refer to FIG. 1) including the voltage generator VG may be provided.

The case where the zero current is not detected in the second area AR2 is illustrated in FIG. 7 as an example.

A mode "VO1 mode" for operating the first output voltage VO1 may be driven in the first area AR1 and the second area AR2 independently of each other.

In the first area AR1, the mode "VO1 mode" for operating the first output voltage VO1 may be set to a first mode M1 being the buck mode or a second mode M2 being the buck-boost mode.

In the second area AR2, the mode "VO1 mode" for operating the first output voltage VO1 may be set to the second mode M2.

In an embodiment, for example, the mode "VO1 mode" for operating the first output voltage VO1 may be set to the mode determined based on the flowchart illustrated in FIG. 6.

A mode "VO3 mode" for operating the third output voltage VO3 may be driven in the first area AR1 and the second area AR2 independently of each other.

In the first area AR1, the mode "VO3 mode" for operating the third output voltage VO3 may be set to the first mode M1 being the buck mode or the second mode M2 being the buck-boost mode.

In the second area AR2, the mode "VO3 mode" for operating the third output voltage VO3 may be set to the second mode M2.

According to an embodiment of the disclosure, in the first area AR1 being the light load area as a main use area, the voltage generator VG may select one of the buck mode and the buck-boost mode depending on a situation and may be driven in the selected mode. In an embodiment, for example, the voltage generator VG may determine a mode based on a voltage difference between the input voltage VIN and the output voltage VO1 or VO3. Depending on a situation, the voltage generator VG may operate in the buck mode higher in efficiency than the buck-boost mode. Accordingly, the voltage generator VG capable of reducing power consumption and the display device 1000 (refer to FIG. 1) including the voltage generator VG may be provided.

According to an embodiment of the disclosure, when the zero current is not detected in the second area AR2 being the heavy load area such as a high brightness mode (HBM) of expressing maximum luminance, the voltage generator VG may operate in the buck-boost mode. When the voltage generator VG operates in the buck-boost mode, the ripple of the second driving voltage ELVSS may decrease compared to the case of operating in the buck mode such that the flicker of the image displayed in the display layer 100 (refer to FIG. 3) may decrease. Accordingly, the voltage generator VG with improved display quality and the display device 1000 (refer to FIG. 1) including the voltage generator VG may be provided.

Figure 8:
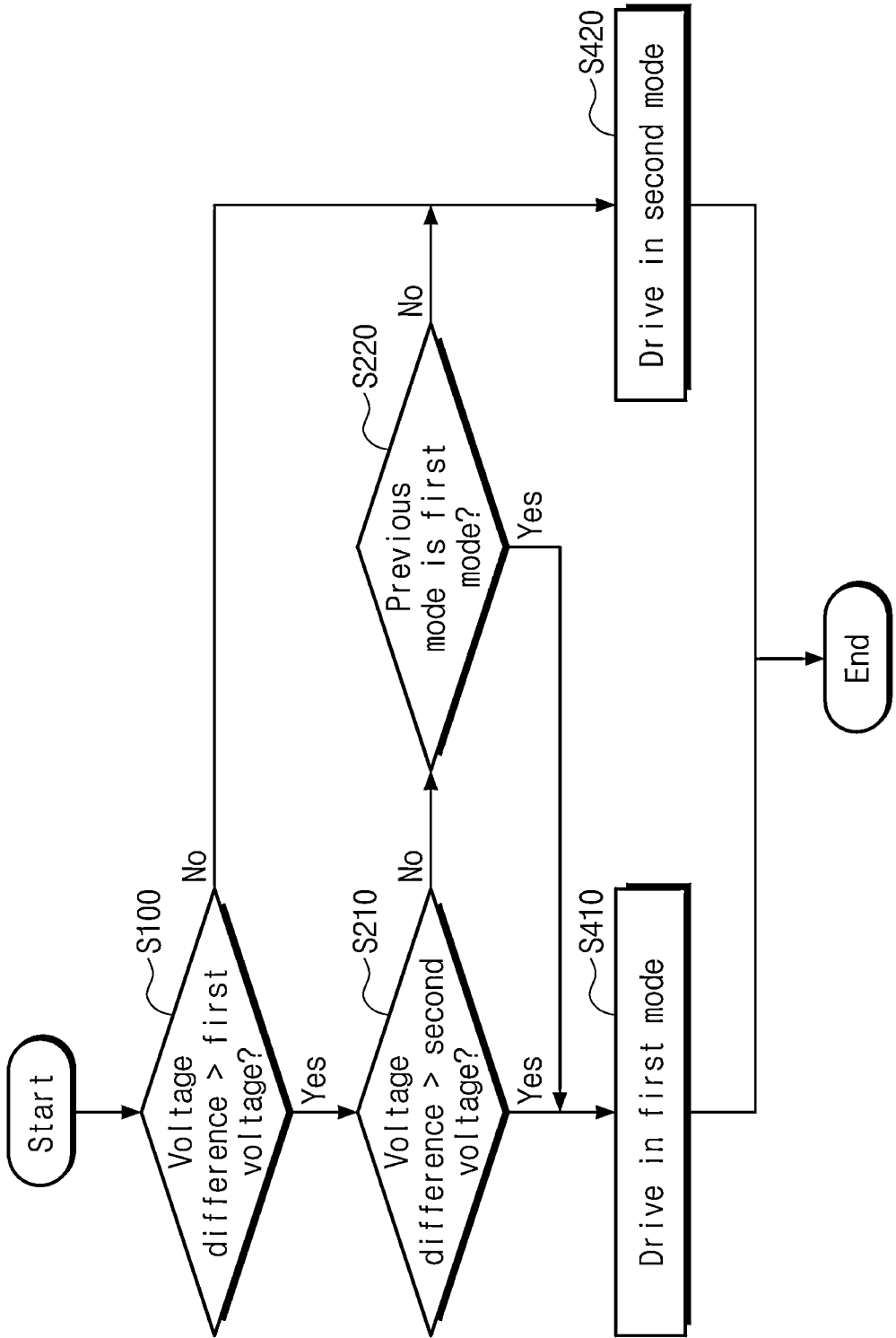
FIG. 8 is a flowchart illustrating a driving method of a voltage generator operating in a second driving mode, according to an embodiment of the disclosure.

FIG. 8 is a flowchart illustrating a driving method of a voltage generator operating in a second driving mode, according to an embodiment of the disclosure. In FIG. 8, the same or like components as those described above with reference to FIG. 6 are labeled with the same or like reference numerals/signs, and thus, any repetitive detailed description thereof will be omitted to avoid redundancy.

Referring to FIGS. 5 and 8, an embodiment of the voltage generator VG may operate in the second driving mode.

The first mode signal MD1 may be output when the voltage difference exceeds the first voltage and the second voltage higher in voltage level than the first voltage or when the voltage difference exceeds the first voltage and is less than or equal to the second voltage and the previous mode of the single inductive element 310 is the first mode. When the controller 340 receives the first mode signal MD1, the controller 340 may output the control signal CS to the gate driver 320 in a way such that the single inductive element 310 is driven in the first mode (S410).

The second mode signal MD2 may be output when the voltage difference is less than or equal to the first voltage or when the voltage difference exceeds the first voltage and is less than or equal to the second voltage and the previous mode of the single inductive element 310 is the second mode. When the controller 340 receives the second mode signal MD2, the controller 340 may output the control signal CS to the gate driver 320 in a way such that the single inductive element 310 is driven in the second mode (S420).

According to an embodiment of the disclosure, the voltage generator VG may determine a mode based on a voltage difference between the input voltage VIN and the output voltage VO1 or VO3. In such an embodiment, the controller 340 may operate in the buck mode higher in efficiency than the buck-boost mode to improve power consumption depending on a situation. Accordingly, the voltage generator VG capable of reducing power consumption and the display device 1000 (refer to FIG. 1) including the voltage generator VG may be provided.

Figure 9:
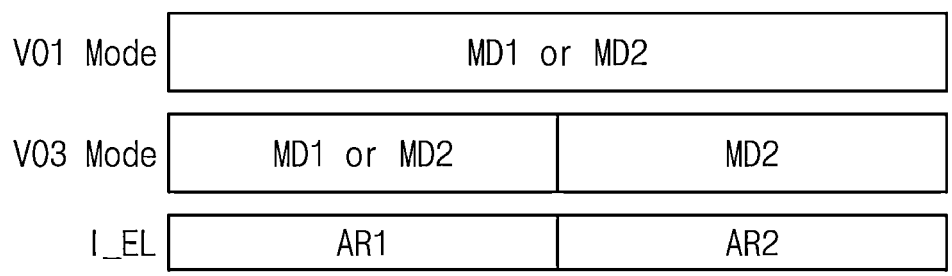
FIG. 9 is a block diagram illustrating an operation of a voltage generator operating in a second driving mode, according to an embodiment of the disclosure.

FIG. 9 is a block diagram illustrating an operation of a voltage generator operating in a second driving mode, according to an embodiment of the disclosure. In FIG. 9, the same or like components as those described with reference to FIG. 7 are labeled with the same or like reference numerals/signs, and thus, any repetitive detailed description thereof will be omitted to avoid redundancy.

Referring to FIGS. 5 and 9, an embodiment of the voltage generator VG may operate in the second driving mode.

The mode "VO1 mode" for operating the first output voltage VO1 may be driven in the first mode M1 or the second mode M2 regardless of the first area AR1 and the second area AR2.

In an embodiment, for example, the mode "VO1 mode" for operating the first output voltage VO1 may be set to the mode determined based on the flowchart illustrated in FIG. 8.

The mode "VO3 mode" for operating the third output voltage VO3 may be driven in the first area AR1 and the second area AR2 independently of each other.

In the first area AR1, the mode "VO3 mode" for operating the third output voltage VO3 may be set to the first mode M1 being the buck mode or the second mode M2 being the buck-boost mode.

In the second area AR2, the mode "VO3 mode" for operating the third output voltage VO3 may be set to the second mode M2. According to an embodiment of the disclosure, in the case of the third output voltage VO3, because the load is light, it is desired to drive the third output voltage VO3 in the second mode M2 in the second area AR2.

According to an embodiment of the disclosure, in areas including both the first area AR1 the light load area and the second area AR2 being the heavy load area, the voltage generator VG may select one of the buck mode and the buck-boost mode depending on a situation and may be driven in the selected mode. In an embodiment, for example, the voltage generator VG may determine a mode based on a voltage difference between the input voltage VIN and the output voltage VO1 or VO3. Depending on a situation, the voltage generator VG may operate in the buck mode higher in efficiency than the buck-boost mode. Accordingly, the voltage generator VG capable of reducing power consumption and the display device 1000 (refer to FIG. 1) including the voltage generator VG may be provided.

The voltage generator VG according to an embodiment of the disclosure may operate in the third driving mode.

In the third driving mode, the mode for operating the first output voltage VO1 and the third output voltage VO3 may be driven in the second mode M2 regardless of the first area AR1 and the second area AR2.

According to an embodiment of the disclosure, in the case of operating in the second mode M2 being the buck-boost mode, the ripple of the second driving voltage ELVSS may decrease compared to the case of operating in the first mode M1 such that the flicker of the image displayed in the display layer 100 (refer to FIG. 3) may decrease. Accordingly, the voltage generator VG with improved display quality and the display device 1000 (refer to FIG. 1) including the voltage generator VG may be provided.

Figure 10:
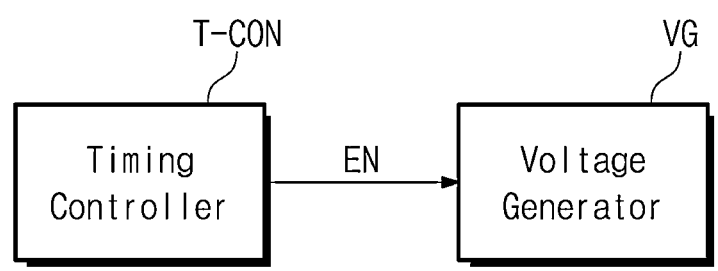
FIG. 10 is a block diagram partially illustrating a display device according to an embodiment of the disclosure.
Figure 11:
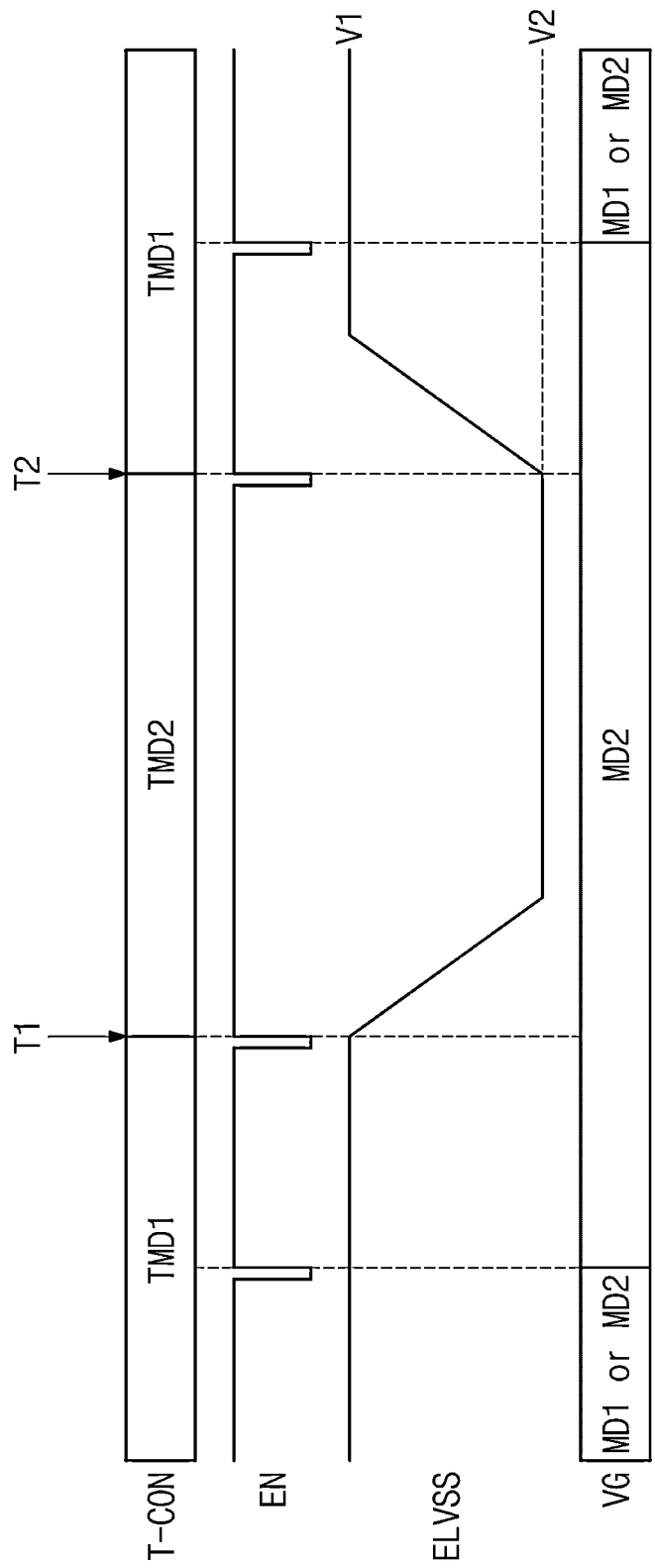
FIG. 11 illustrates a driving method of a display device according to an embodiment of the disclosure.

FIG. 10 is a block diagram partially illustrating a display device according to an embodiment of the disclosure, and FIG. 11 illustrates a driving method of a display device according to an embodiment of the disclosure. In FIG. 10, the same or like components as those described with reference to FIG. 4 are labeled with the same or like reference numerals/signs, and thus, any repetitive detailed description thereof will be omitted to avoid redundancy.

Referring to FIGS. 10 and 11, in an embodiment, the timing controller T-CON may allow the display layer 100 (refer to FIG. 4) to operate in a normal mode TMD1 or a high luminance mode TMD2. The high luminance mode TMD2 may be also referred to as a "high brightness mode (HBM)".

In the normal mode TMD1, the voltage generator VG may operate in the first mode or the second mode.

Before the display layer 100 (refer to FIG. 4) operates in the high luminance mode TMD2, the timing controller T-CON may output an enable signal EN to the voltage generator VG.

When the voltage generator VG receives the enable signal EN, the voltage generator VG may drive the single inductive element 310 in the second mode.

The timing controller T-CON may output the enable signal EN to the voltage generator VG at a first time T1 when the high luminance mode TMD2 is enabled.

When the voltage generator VG receives the enable signal EN at the first time T1, the voltage generator VG may adjust the voltage level of the second driving voltage ELVSS from a first voltage level V1 to a second voltage level V2 to operate in the high luminance mode TMD2.

The timing controller T-CON may output the enable signal EN to the voltage generator VG at a second time T2 when the high luminance mode TMD2 is disabled.

When the voltage generator VG receives the enable signal EN at the second time T2, the voltage generator VG may adjust the voltage level of the second driving voltage ELVSS from the second voltage level V2 to the first voltage level V1 to operate in the normal mode TMD1.

After the display layer 100 (refer to FIG. 4) operates in the high luminance mode TMD2, the timing controller T-CON may output the enable signal EN to the voltage generator VG.

When the voltage generator VG receives the enable signal EN, the voltage generator VG may drive the single inductive element 310 in the first mode or second mode.

According to embodiments, as described above, the voltage generator may determine the lightness and heaviness of the load through the zero-current detector. When the load is light, the controller may operate in the buck mode higher in efficiency than the buck-boost mode to improve power consumption. Accordingly, the voltage generator capable of reducing power consumption and the display device including the voltage generator may be provided. In such an embodiment, when the load is heavy, the controller may operate in the buck-boost mode, in which the ripple of the second driving voltage decreases compared to the buck mode, to secure stability, such that the flicker of the image displayed in the display layer may decrease. Accordingly, the voltage generator with improved display quality and the display device including the same may be provided.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A display device comprising:
a display layer including a plurality of pixels;
a voltage generator which receives an input voltage and provides a driving voltage to the plurality of pixels; and
a timing controller which receives an image signal and drives the plurality of pixels,
wherein the voltage generator includes:
a single inductive element which performs a direct current-to-direct current conversion on the input voltage to generate a first output voltage, a second output voltage, and a third output voltage;
a gate driver which controls the single inductive element;
a mode determiner which receives the input voltage, a first feedback voltage generated based on the first output voltage, and a third feedback voltage generated based on the third output voltage and outputs a mode signal;
a zero-current detector which is connected to the single inductive element, and outputs a zero-current signal; and
a controller which receives the mode signal and the zero-current signal and outputs a control signal to the gate driver.

2. The display device of claim 1, wherein the single inductive element includes an inductor and a plurality of switches connected to the inductor.

3. The display device of claim 2, wherein the zero-current detector detects a current of the inductor.

4. The display device of claim 2, wherein the gate driver outputs a gate control signal, which controls a turn-on or a turn-off of each of the plurality of switches, in a way such that the single inductive element is driven in a first mode or in a second mode different from the first mode.

5. The display device of claim 4, wherein the mode determiner calculates a voltage difference between the input voltage and the first output voltage or between the input voltage and the second output voltage,
wherein the mode signal includes a first mode signal and a second mode signal,
wherein the first mode signal is output when the voltage difference exceeds a first voltage and a second voltage higher in voltage level than the first voltage or when the voltage difference exceeds the first voltage and is less than or equal to the second voltage and a previous mode of the single inductive element is the first mode, and
wherein the second mode signal is output when the voltage difference is less than or equal to the first voltage or when the voltage difference exceeds the first voltage and is less than or equal to the second voltage and the previous mode of the single inductive element is the second mode.

6. The display device of claim 5, wherein the first mode is a buck mode, and
wherein the second mode is a buck-boost mode.

7. The display device of claim 5, wherein the controller drives the single inductive element in a first driving mode, a second driving mode, or a third driving mode,
wherein, in the first driving mode, the controller generates the control signal based on the mode signal and the zero-current signal,
wherein, in the second driving mode, the controller generates the control signal based only on the mode signal, and
wherein, in the third driving mode, the controller generates the control signal in a way such that the single inductive element is driven only in the second mode.

8. The display device of claim 7, wherein, in the first driving mode,
when the controller receives the first mode signal and the zero-current signal having a first value, the single inductive element is driven in the first mode,
when the controller receives the first mode signal and the zero-current signal having a second value different from the first value, the single inductive element is driven in the second mode, and
when the controller receives the second mode signal, the single inductive element is driven in the second mode.

9. The display device of claim 4, wherein the timing controller allows the display layer to operate in a high luminance mode,
wherein, before the display layer operates in the high luminance mode, the timing controller outputs an enable signal to the voltage generator, and
wherein, when the voltage generator receives the enable signal, the voltage generator drives the single inductive element in the second mode.

10. The display device of claim 4, wherein each of the first output voltage and the third output voltage is generated when the single inductive element is driven in the first mode being a buck mode or the second mode being a buck-boost mode, and
wherein the second output voltage is generated when the single inductive element is driven in an inverting buck-boost mode.

11. The display device of claim 1, wherein the driving voltage includes:
a first driving voltage generated based on the first output voltage; and
a second driving voltage generated based on the second output voltage and lower in voltage level than the first driving voltage.

12. A voltage generator comprising:
a single inductive element which performs a direct current-to-direct current conversion on an input voltage to generate a first output voltage, a second output voltage, and a third output voltage;
a gate driver which controls the single inductive element;
a mode determiner which receives the input voltage, a first feedback voltage generated based on the first output voltage, and a third feedback voltage generated based on the third output voltage and outputs a mode signal;
a zero-current detector which is connected to the single inductive element and outputs a zero-current signal; and
a controller which receives the mode signal and the zero-current signal and outputs a control signal to the gate driver.

13. The voltage generator of claim 12, wherein the single inductive element includes a buck-boost converter including an inductor and a plurality of switches connected to the inductor.

14. The voltage generator of claim 13, wherein the zero-current detector detects a current of the inductor.

15. The voltage generator of claim 13, wherein the gate driver outputs a gate control signal, which controls a turn-on or a turn-off of each of the plurality of switches, in a way such that the single inductive element is driven in a first mode or in a second mode different from the first mode.

16. The voltage generator of claim 15, wherein the mode determiner calculates a voltage difference between the input voltage and the first output voltage or between the input voltage and the second output voltage,
wherein the mode signal includes a first mode signal and a second mode signal,
wherein the first mode signal is output when the voltage difference exceeds a first voltage and a second voltage higher in voltage level than the first voltage or when the voltage difference exceeds the first voltage and is smaller than or equal to the second voltage and the mode signal previously output by the mode determiner is the first mode signal, and
wherein the second mode signal is output when the voltage difference is less than or equal to the first voltage or when the voltage difference exceeds the first voltage and is less than or equal to the second voltage and the mode signal previously output by the mode determiner is the second mode signal.

17. The voltage generator of claim 16, wherein the first mode is a buck mode, and
wherein the second mode is a buck-boost mode.

18. The voltage generator of claim 16, wherein the controller drives the single inductive element in a first driving mode, a second driving mode, or a third driving mode,
wherein, in the first driving mode, the control signal is generated based on the mode signal and the zero-current signal,
wherein, in the second driving mode, the control signal is generated based only on the mode signal, and
wherein, in the third driving mode, the control signal is generated such that the single inductive element is driven only in the second mode.

19. The voltage generator of claim 18, wherein, in the first driving mode,
when the controller receives the first mode signal and the zero-current signal having a first value, the single inductive element is driven in the first mode,
when the controller receives the first mode signal and the zero-current signal having a second value different from the first value, the single inductive element is driven in the second mode, and
when the controller receives the second mode signal, the single inductive element is driven in the second mode.

20. The voltage generator of claim 15, wherein each of the first output voltage and the third output voltage is generated when the single inductive element is driven in the first mode being a buck mode or the second mode being a buck-boost mode, and
wherein the second output voltage is generated when the single inductive element is driven in an inverting buck-boost mode.

* * * * *